(12) United States Patent
Wu et al.

(10) Patent No.: US 11,301,705 B2
(45) Date of Patent: Apr. 12, 2022

(54) OBJECT DETECTION USING MULTIPLE NEURAL NETWORK CONFIGURATIONS

(71) Applicant: Western Digital Technologies, Inc., San Jose, CA (US)

(72) Inventors: Haoyu Wu, Sunnyvale, CA (US); Shaomin Xiong, San Jose, CA (US); Toshiki Hirano, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 109 days.

(21) Appl. No.: 16/803,851

(22) Filed: Feb. 27, 2020

(65) Prior Publication Data
US 2021/0271912 A1 Sep. 2, 2021

(51) Int. Cl.
*G06N 3/08* (2006.01)
*G06T 7/40* (2017.01)
*G06K 9/00* (2022.01)

(52) U.S. Cl.
CPC ...... *G06K 9/00993* (2013.01); *G06K 9/00711* (2013.01); *G06N 3/08* (2013.01); *G06T 7/40* (2013.01); *G06T 2207/10016* (2013.01); *G06T 2207/20084* (2013.01)

(58) Field of Classification Search
CPC combination set(s) only.
See application file for complete search history.

(56) References Cited

U.S. PATENT DOCUMENTS

| | | | |
|---|---|---|---|
| 6,388,710 B1 | 5/2002 | McKune et al. | |
| 7,050,607 B2 | 5/2006 | Li et al. | |
| 7,324,671 B2 | 1/2008 | Li et al. | |
| 8,184,853 B2 | 5/2012 | Pilu et al. | |
| 9,002,060 B2 | 4/2015 | Datta et al. | |
| 9,025,875 B2 | 5/2015 | Matsumoto et al. | |
| 9,177,360 B2 | 11/2015 | Cieplinski et al. | |
| 9,251,425 B2 | 2/2016 | Datta et al. | |
| 9,436,999 B2 | 9/2016 | Cieplinski et al. | |
| 9,484,022 B2 | 11/2016 | Gruenstein | |
| 2002/0198640 A1 | 12/2002 | Gehlot et al. | |
| 2005/0275549 A1 | 12/2005 | Barclay et al. | |
| 2007/0276776 A1 | 11/2007 | Sagher et al. | |

(Continued)

FOREIGN PATENT DOCUMENTS

EP 1173020 B1 4/2004

OTHER PUBLICATIONS

Salman Mohagheghi, "Optimal Wide Area Controller and State Predictor for a Power System," Apr. 30, 2007, IEEE Transactions on Power Systems, vol. 22, No. 2, May 2007, pp. 693-700.*

(Continued)

*Primary Examiner* — Omar S Ismail
(74) *Attorney, Agent, or Firm* — Patterson & Sheridan, LLP; Steven H. Versteeg

(57) ABSTRACT

This disclosure relates to an apparatus for object detection. The apparatus comprises a video camera, an object detector, and a controller. The video camera may be configured to generate a video stream of frames. The object detector may be configured to accept the video stream as input data and to perform object detection. The controller may be coupled to the video camera and the object detector. The controller may be configured to manage object detection in order to satisfy a performance metric and/or operate within an operational constraint.

20 Claims, 13 Drawing Sheets

(56) References Cited

U.S. PATENT DOCUMENTS

| | | | |
|---|---|---|---|
| 2010/0082126 | A1 | 4/2010 | Matsushita |
| 2013/0279756 | A1 | 10/2013 | Menadeva et al. |
| 2018/0129893 | A1 | 5/2018 | Son et al. |
| 2018/0157965 | A1 | 6/2018 | Sun et al. |
| 2019/0050714 | A1 | 2/2019 | Nosko et al. |
| 2019/0130580 | A1* | 5/2019 | Chen ................ G06K 9/2054 |
| 2019/0236438 | A1 | 8/2019 | Odena et al. |
| 2019/0295262 | A1* | 9/2019 | Nagori .................. G06T 7/20 |
| 2020/0175401 | A1* | 6/2020 | Shen .................... G06N 5/04 |

OTHER PUBLICATIONS

Dumitru Erhan,"Scalable Object Detection using Deep Neural Networks",Jun. 2014, Proceedings of the IEEE Conference on Computer Vision and Pattern Recognition (CVPR), 2014, pp. 1-7.*

Pooya Hajebi,"Online Adaptive Fuzzy Logic Controller Using Genetic Algorithm and Neural Network for Networked Control Systems", Mar. 28, 2013,2013 15th International Conference on Advanced Communications Technology (ICACT), Nov. 2012,pp. 88-92.*

Ignazio Gallo,"Learning Object DetectionUsing Multiple Neural Networks",Mar. 25, 2011,In Proceedings of the International Conference on Computer Vision Theory and Applications (VISAPP-2011), pp. 131-135.*

Hiroki Nakahara,"An Object Detector based on Multiscale Sliding Window Search using a Fully Pipelined Binarized CNN on an FPGA",Feb. 5, 2018,2017 International Conference on Field Programmable Technology (ICFPT),Dec. 11-13, 2017,pp. 168-173.*

Jaewon Moon, Seungwoo Kum, and Sangwon Lee, "A Heterogeneous IoT Data Analysis Framework with Collaboration of Edge-Cloud Computing: Focusing on Indoor PM10 and PM2.5 Status Prediction", 2019, Sensors, vol. 19, No. 14, Jul. 10, 2019, pp. 3038.

Patrick D. Smith, posted on the site by K @ Kayis, "Building an Autoencoder for Generative Models", Jan. 29, 2019.

* cited by examiner

NO, OR INTERMITTENT, CONNECTION
TO NETWORK SERVERS

OBJECT DETECTION USING MULTIPLE NEURAL NETWORK CONFIGURATIONS

BACKGROUND

Neural networks (NNs) are now widely used for artificial intelligence (AI) applications. Some examples are image classification, object detection, segmentation, natural language process, etc. NNs particularly provide a very effective and accurate means of object detection. "Object detection" refers to a process for determining, or predicting, a class and/or a location for an object within an image or frame. "Frame" refers to a single image of a plurality of images in a video stream. A frame may also be referred to as a video frame. A frame may comprise data values for a number of pixels in a length direction, a width direction and a depth direction (e.g., generally an red value, a green value, and a blue value) and may also include metadata for the frame such as a sequence number within a plurality of frames, or the like.

Object detection may also include a process for determining or predicting a class and/or a location for a plurality of objects within an image or frame. Object detection may determine both the class and location of objects in a frame. Various methods may be used to identify or designate the location and/or certain attributes of the object including bounding boxes, masks, center location of the object, object size, object orientation, and other properties.

One drawback to the use of NNs in object detection is that NNs are heavy on computation: one NN usually consists of millions to billions of parameters. The number of numeral computations (referred to as a floating-point operations (FLOP)) may also be in the billions. For example, You only Look Once (YOLO) version 3, a state-of-the-art NN, has 61.9 million parameters and 33.4 billion FLOPs. Therefore, conventionally NN object detection logic is usually deployed on specialized hardware, such as graphics processing units (GPUs), field-programmable gate arrays (FPGAs), proprietary application-specific integrated circuits (ASICs), etc.

Each type of hardware has its own advantages and drawbacks, such as computation speed, memory size, power consumption, ease of deployment, etc. One way to perform NN object detection may be using a cloud service where the hardware is hidden behind an application program interface (API). However, with the rise of Internet of Things (IoT), the IoT devices are being required to do more and more computation locally on the device, preventing reliance on the cloud. For example, a smart security camera may be tasked to run certain object detection algorithms offline when the security camera's connection with the server is disrupted or unavailable.

Such IoT devices, edge devices, used for object detection are often battery or solar panel operated, which places strict limits on the hardware's power consumption. Therefore, the design of such edge devices requires a balance between power consumption and the NN object detection performance. As used herein, "performance" refers to how accurately the edge device and/or software of the edge device detects objects and/or events in a frame. Performance may be quantified using a performance metric or performance score, described below. Under reduced power consumption conditions, the speed and/or the accuracy of NN object detection may drop. In conventional solutions, the edge device may include just one neural network responsible for one task, running in a single setting. In such a conventional solution, the power consumption/performance trade-off cannot be balanced. There is a need for a solution that allows object detection to be performed while maintaining a balance between power consumption and performance.

BRIEF SUMMARY

This disclosure relates to an apparatus for object detection. The apparatus comprises a video camera, an object detector, and a controller. The video camera may be configured to a video stream of frames. The object detector may be configured to accept the video stream as input data and to perform object detection. The controller may be coupled to the video camera and the object detector. The controller may be configured to manage object detection in order to satisfy a performance metric and/or operate within an operational constraint.

This disclosure further relates to a system for object detection. The system comprises a video camera, a plurality of processors, volatile memory, non-volatile memory, and a power source. The video camera may be configured to generate a video stream of frames. The processors may be configured to execute object detection logic to perform object detection on the frames. The volatile memory may be configured to store data for and executable code for the object detection logic. The non-volatile memory may be configured to store a plurality of neural networks. Each neural network may comprise different attributes.

The power source may be configured to supply electrical power to the non-volatile memory, the volatile memory, the plurality of processors, and the video camera. The object detection logic may be configured to operate a selected neural network from the plurality of neural networks in real-time to generate object detection results. The object detection logic may also be configured to determine the selected neural network to perform object detection based on attributes of the selected neural network, a plurality of performance metrics, and a plurality of operational constraints.

Finally, this disclosure relates to a method for object detection. First, a video stream from a video camera may be reviewed. Object detection results may then be generated based on the video stream by way of a selected neural network, selected from a plurality of neural networks. The neural network may be selected such that its attributes satisfy both performance metrics and/or operational constraints for an object detection operation. The selected neural network may be automatically changed to another neural network from the plurality of neural networks in response to the object detection results failing to satisfy at least one performance metric for the object detection operation.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
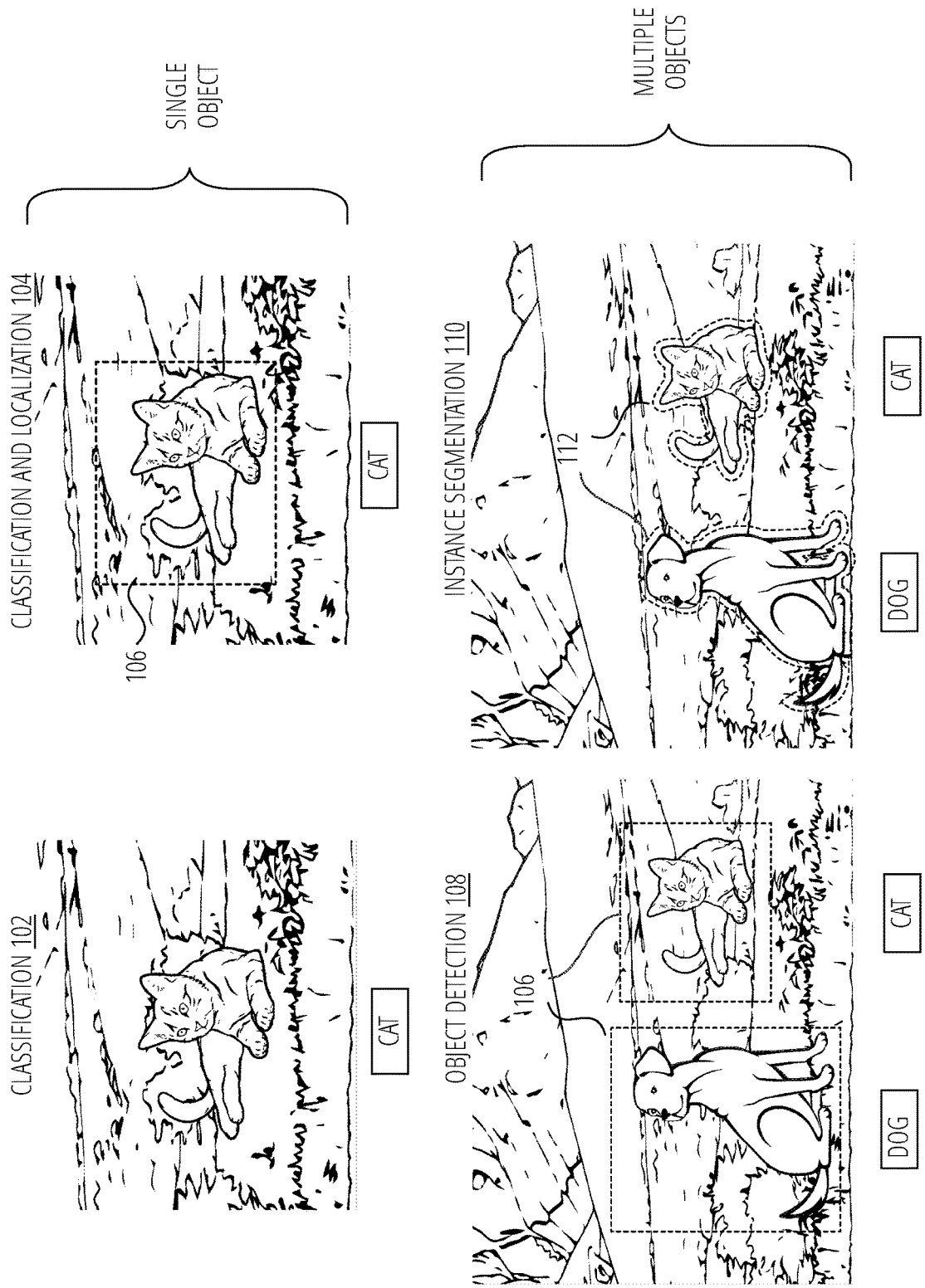
FIG. 1 illustrates a comparison between image classification, object detection, and instance segmentation.

In an edge device (IoT device) employing a neural network (NN), one or more specialized hardware elements may be deployed. For example, a device might have an integrated GPU (iGPU), a separate GPU, an ASIC NN accelerator, or any combinations of the aforementioned hardware, etc. Even if the edge device has only one hardware element, the hardware can be set to run in a balanced mode, energy-saving mode, or high-performance mode.

"Neural network" refers to any logic, circuitry, component, chip, die, package, module, system, sub-system, or computing system configured to perform tasks by imitating biological neural networks of people or animals. (Search "Artificial neural network" on Wikipedia.com Jul. 29, 2019. Accessed Aug. 16, 2019.) Neural network, as used herein, may also be referred to as artificial neural network (ANN). Examples of neural networks that may be used with various embodiments of the disclosed solution include, but are not limited to, convolutional neural networks, feed forward neural networks, radial basis neural network, recurrent neural networks, modular neural networks, and the like. Certain neural networks may be designed for specific tasks such as object detection, natural language processing (NLP), natural language generation (NLG), and the like. Examples of neural networks suitable for objection detection include, but are not limited to, Region-based Convolutional Neural Network (RCNN), Spatial Pyramid Pooling (SPP-net), Fast Region-based Convolutional Neural Network (Fast R-CNN), Faster Region-based Convolutional Neural Network (Faster R-CNN), You only Look Once (YOLO), Single Shot Detector (SSD), and the like.

A neural network may include both the logic, software, firmware, and/or circuitry for implementing the neural network as well as the data and metadata for operating the neural network. One or more of these components for a neural network may be embodied in one or more of a variety of repositories, including in one or more files, databases, folders, or the like.

The neural network used with embodiments disclosed herein may employ one or more of a variety of learning models including, but not limited to, supervised learning, unsupervised learning, and reinforcement learning. These learning models may employ various backpropagation techniques.

"Mode" refers to a method for operating an object that includes a predefined set of features, attributes, behaviors, and characteristics relating to operation of the object. In certain embodiments, the mode may relate directly to the number, type, and/or capabilities of processors available to perform object detection. Examples of such a mode may include, a mode that specifically identifies what type of processor will be used for object detection. In such examples, the mode may comprise a name that identifies the processor type, such as GPU mode, CPU mode, ASIC mode, FPGA mode, and the like.

In the same or in alternative embodiments, mode may comprise a level of computing precision used for calculations performed by a processor. For example, different precision modes may comprise 8-bit precision, 16-bit precisions, 32-bit precision, 64-bit precision, 128-bit precision, and the like. In such precision mode related embodiments, a lower number bit, such as 8 may be referred to as a low-precision mode and a higher number bit such as 128 may be referred to as a high-precision mode. Those of skill in the art will appreciate that processors may be configured to operate in different precision mode. In addition, low-precision mode operation may use less computing resources (e.g., processor cycles, and memory) but may result in computations that are less accurate or precise. Conversely, high-precision mode operation may use more computing resources (e.g., processor cycles, and memory) but may result in computations that are more accurate or precise.

In the same or in alternative embodiments, mode may comprise whether computing resources such as a processor is in an operating state, that consumes electric power, a sleep state, that consumes minimal electric power, a hibernation state, that consumes nominal electric power, or an off state, that consumes substantially no electric power.

It is also possible for a piece of hardware to run different kinds of NN models, for example a large or heavy model, which may take more time and more power to run and may be more accurate, or a small or light model, which may be less accurate but may be faster and may require less power. Thus, an edge device may be configured to run in a high-power mode, a low power mode, or a mid or balanced power mode, based on hardware difference, setting difference, or NN model difference.

This disclosure describes an apparatus, system, and method for object detection by which requirements for NN object detection performance may be determined, and an NN object detection method may be chosen to meet performance requirements with the lowest power consumption. An NN object detection framework may be implemented having two layers: a detection layer and a control layer. The detection layer may use a detector to receive time-continuous input video and from this input generate an output.

The control layer may use available information to control the detector. Control of the detector may comprise switching to different object detectors, switching a single object detector into different modes, or turning an object detector on and off. "Object detector" refers to circuitry, a state machine, logic, firmware, software, machine bottleneck, object bottleneck, or the like, configured to perform object detection. In certain embodiments, an object detector may comprise logic to perform object detection. In other embodiments, an object detector may comprise both logic, hardware, processors, and associated data or datasets to perform object detection.

In certain embodiments, an object detector may comprise a neural network. In such embodiments, each neural network configured as an object detector may comprise an independent neural network with no dependencies or interrelationships with other neural networks. The operation of one neural network as an object detector for certain embodiments, may have no connection or interaction with other neural networks. In certain embodiments, a neural network operating as an object detector, or logic of an object detector, may interact with an autoencoder to determine frame complexity levels. An autoencoder encodes an input image into a bottleneck for use in comparison adjacent images in a sequence to determine how much a scene changes over a period of time.

Where the object detector comprises a neural network, the neural network may be configured according to a single-stage detector model or a two-stage detector model. Where the neural network of the object detector is configured according to a single-stage detector model, the neural network may comprise, for example, a You only Look Once (YOLO) neural network or a Single Shot Detector (SSD) neural network or the like. Where the neural network of the object detector is configured according to a two-stage detector model, the neural network may comprise, for example, a Region-based Convolutional Neural Network (RCNN), Spatial Pyramid Pooling (SPP-net), Fast Region-based Convolutional Neural Network (Fast R-CNN), Faster Region-based Convolutional Neural Network (Faster R-CNN), or the like. In configuring the detector to implement different configurations of a number of NNs, the disclosed object detection solution may run at different power consumption and performance levels, achieving a necessary level of performance within necessary power consumption limits.

With different designs of the control layer, there might be "detector selector", "detector mode selector" or "detector switch" in the control layer. In certain embodiments, these may each individually or in various combinations be referred to as a "controller". "Controller" refers to a hardware, device, component, element, circuitry, logic, or circuit configured to manage and control operation of another software, hardware, firmware, system, sub-system, device, apparatus, or logic unit, component, device, or component.

The controller may take in available information to make decisions. This information may include a current and the historical video/audio input and the current and the historical detection results. The controller may determine how "dynamic" or complex a video/audio segment is based on this information. If a segment has a certain complexity level, the controller may choose to use more a more complex/high power detector or may choose to turn on the detector to get faster, more accurate results. Otherwise, the controller may choose to use a less complex/low power detector or turn off an object detector to save power.

"Complexity level" refers to a measure of how much one frame differs from adjacent frames in a sequence of frames. Differences between frames for a complexity level may be done at various levels. For example, at one level a comparison is made to determine whether two adjacent frames include the same object. At another level, a comparison is made to determine how many objects appear or disappear between frames.

A complexity level for a frame may depend on how a particular frame differs from other frames in a sequence of frames in a video stream. In certain embodiments, the temporal information of a frame (e.g., its frame sequence number, timestamp, or the like) may be used to determine a complexity level for a frame.

In addition to temporal information regarding one frame relative to one or more adjacent frames that came before or that come after in determining a complexity level, temporal information about what time of day the frame was generated may be used as temporal information to determine a complexity level. For example, timestamp temporal information for evening hours may introduce a bias or expectation that activity of persons or things in the view of a video camera creating frame will be low.

At another level, a comparison is made to determine an optical flow between frames. Optical flow or optic flow is the pattern of apparent motion of objects, surfaces, and edges in a visual scene caused by the relative motion between an observer and a scene. (Search "optical flow" on Wikipedia.com, Dec. 17, 2019. Accessed Jan. 8, 2020.) At another level, a comparison is made to determine how pixels change between frames.

"Video stream" refers to a sequence of digital images, also referred to as frames organized in the order in which the frames are, or were, captured by a video generation device such as a video camera. A video stream may originate from a video camera and be generated in real time or a video stream may originate from a stored set of video frames such as a video file on a local or remote storage device. Another term that may be used in place of video stream is video flow.

For video, motion from one frame to another may be compared, ether for an entire frame, for a particular region, or for a particular object of interest. Certain motion among background objects such as trees may be omitted from the complexity calculation, while other motion of one or more people, vehicles, or other specific objects of interest may increase the video complexity calculated. For audio, sound complexity may be analyzed. A complexity score may be generated and used by a controller for decision making. A "complexity score" refers to a measure of how complex an image is.

One example of a complexity score is represented by Equation 1.

$$S_V \in [0,1] \qquad \text{Equation 1}$$

Equation 1 may be used by the controller in selecting different detectors, selecting different modes for a detector, and in controlling an on/off detector switch. Those of skill in the art will appreciate that Equation 1 is an example of many types or forms of logic or algorithms that may be used with the claimed embodiments to determine a complexity score. For example, Equation 1 computes a complexity score that ranges between 0 and 1. Of course, those of skill in the art recognize that the algorithm for determining a complexity score may have a variety of ranges including, but not limited to 0 to 1, −1 to 1, 0 to 100, 1 to 1000, and the like.

FIG. 1 illustrates a comparison between image classification, object detection, and instance segmentation. When a single object is in an image, the classification model 102 may be utilized to identify what object is in the image. For instance, the classification model 102 identifies that a cat is in the image. In addition to the classification model 102, a classification and localization model 104 may be utilized to classify and identify the location of the cat within the image with a bounding box 106. When multiple objects are present within an image, an object detection model 108 may be utilized. The object detection model 108 utilizes bounding boxes to classify and locate the position of the different objects within the image. An instance segmentation model 110 detects each object of an image, its localization and its precise segmentation by pixel with a segmentation region 112.

The Image classification models classify images into a single category, usually corresponding to the most salient object. Photos and videos are usually complex and contain multiple objects. This being said, assigning a label with image classification models may become tricky and uncertain. Object detection models are therefore more appropriate to identify multiple relevant objects in a single image. The second significant advantage of object detection models versus image classification ones is that localization of the objects may be provided.

Some of the models that may be utilized to perform image classification, object detection, and instance segmentation include but are not limited to, Region-based Convolutional Network (R-CNN), Fast Region-based Convolutional Network (Fast R-CNN), Faster Region-based Convolutional Network (Faster R-CNN), Region-based Fully Convolutional Network (R-FCN), You Only Look Once (YOLO), Single-Shot Detector (SSD), Neural Architecture Search Net (NASNet), and Mask Region-based Convolutional Network (Mask R-CNN).

These models may utilize a variety of training datasets that include but are not limited to PASCAL Visual Object Classification (PASCAL VOC) and Common Objects in COntext (COCO) datasets.

The PASCAL Visual Object Classification (PASCAL VOC) dataset is a well-known dataset for object detection, classification, segmentation of objects and so on. There are around 10,000 images for training and validation containing bounding boxes with objects. Although, the PASCAL VOC dataset contains only 20 categories, it is still considered as a reference dataset in the object detection problem.

ImageNet has released an object detection dataset since 2013 with bounding boxes. The training dataset is composed of around 500,000 images only for training and 200 categories.

The Common Objects in COntext (COCO) datasets were developed by Microsoft. This dataset is used for caption generation, object detection, key point detection and object segmentation. The COCO object detection consists in localizing the objects in an image with bounding boxes and categorizing each one of them between 80 categories.

Figure 2:
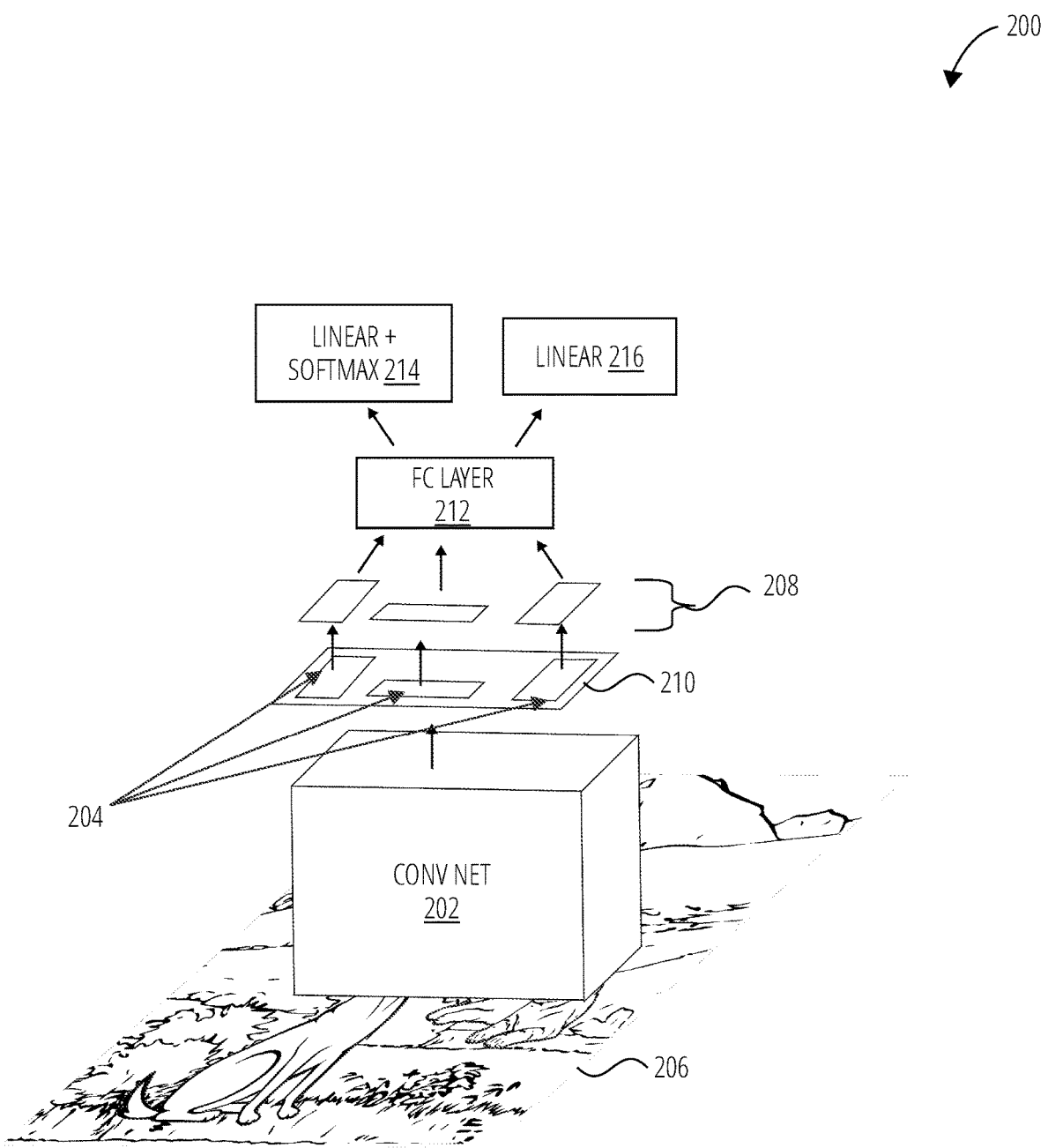
FIG. 2 illustrates a Fast Region-based Convolutional Network 200.

FIG. 2 illustrates an example of a Fast Region-based Convolutional Network 200 (Fast R-CNN). The entire image (input image 206) feeds a CNN model (convolutional neural network 202) to detect Regions of Interest (RoI) (ROI 204) on the feature maps 210. Each region is separated using a RoI pooling layer (ROI pooling layer 208) and the ROI pooling layer 208 feeds fully connected layers 212. This vector is used by a softmax classifier 214 to detect the object and by a bounding box linear regressors 216 to modify the coordinates of the bounding box. The purpose of the Fast R-CNN is to reduce the time consumption related to the high number of models necessary to analyze all region proposals.

A main CNN with multiple convolutional layers is taking the entire image as input instead of using a CNN for each region proposals (R-CNN). Regions of Interest (RoIs) are detected with the selective search method applied on the produced feature maps. Formally, the feature maps size is reduced using a RoI pooling layer to get valid Regions of Interest with fixed height and width as hyperparameters. Each RoI layer feeds fully connected layers creating a features vector. The vector is used to predict the observed object with a softmax classifier and to adapt bounding box localizations with a linear regressor.

Figure 3:
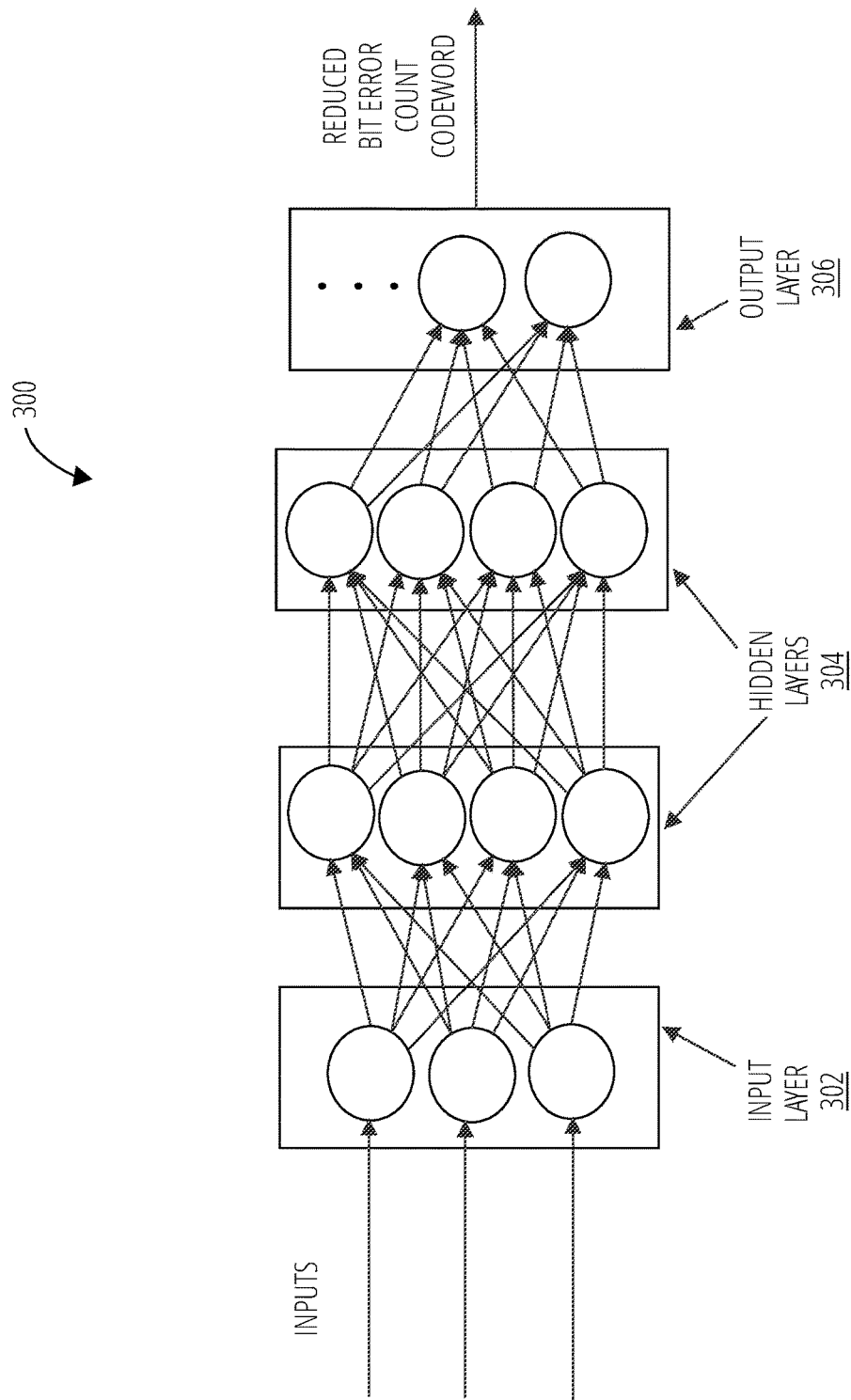
FIG. 3 illustrates a neural network 300 in accordance with one embodiment.

FIG. 3 illustrates a neural network 300 in one embodiment. At a high level, the neural network 300 comprises an input layer 302, two or more hidden layers 304, and an output layer 306. The neural network 300 comprises a collection of connected units or nodes called artificial neurons which loosely model the neurons in a biological brain. Each connection, like the synapses in a biological brain, can transmit a signal from one artificial neuron to another. An artificial neuron that receives a signal can process the signal and then signal additional artificial neurons connected to the artificial neuron.

In a typical embodiment, the signal at a connection between artificial neurons is a real number, and the output of each artificial neuron is computed by some non-linear function (called an activation function) of the sum of the artificial neuron's inputs. The connections between artificial neurons are called 'edges' or axons. Artificial neurons and edges typically have a weight that adjusts as learning proceeds. The weight increases or decreases the strength of the signal at a connection. Artificial neurons may have a threshold (trigger threshold) such that the signal is only sent if the aggregate signal crosses that threshold. Typically, artificial neurons are aggregated into layers. Different layers may perform different kinds of transformations on their inputs. Signals propagate from the first layer (the input layer 302), to the last layer (the output layer 306), possibly after traversing one or more intermediate layers, called hidden layers 304.

The inputs to a neural network may vary depending on the problem being addressed. In object detection, the inputs may be data representing pixel values for certain pixels within an image or frame. In one embodiment the neural network 300 comprises a series of hidden layers in which each neuron is fully connected to neurons of the next layer. The neural network 300 may utilize an activation function such as sigmoid or a rectified linear unit (ReLU), for example. The last layer in the neural network may implement a regression function such as SoftMax regression to produce the classified or predicted classifications for object detection.

In certain embodiments, the neural network 300 is trained prior to deployment and to conserve operational resources. However, some embodiments may utilize ongoing training of the neural network 300 especially when operational resource constraints such as die area and performance are less critical.

Figure 4:
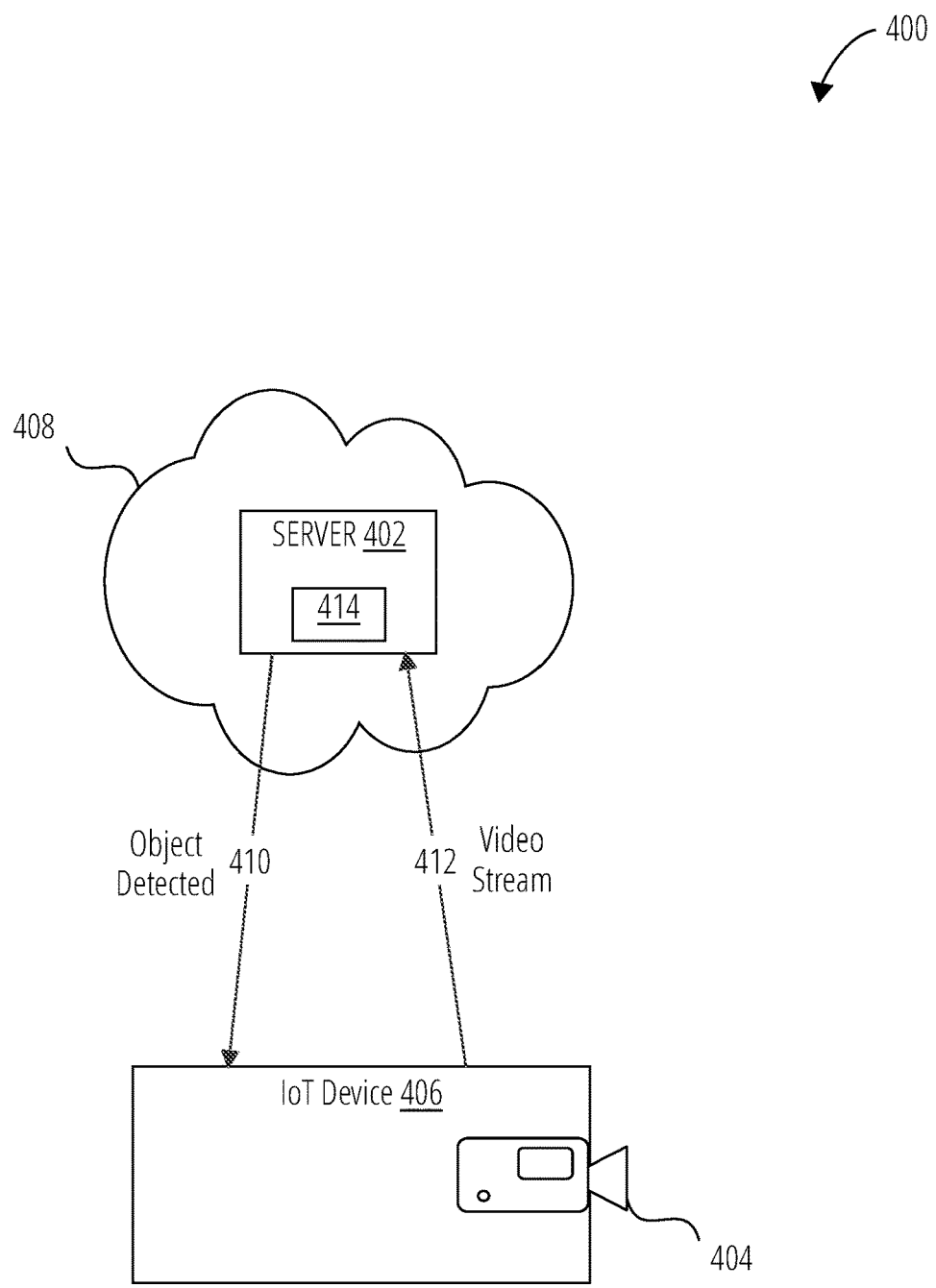
FIG. 4 illustrates a video recording system 400 that uses cloud services for object detection.

FIG. 4 illustrates a conventional cloud-based video recording system 400 in one embodiment. The video recording system 400 comprises a host system 402, a video camera 404, an IoT device 406, a cloud 408, an object detected signal 410, a video stream 412, and a neural network 414.

The cloud 408 represents a communication network that enables the IoT device 406 and host system 402 to communicate and pass data such as a video stream 412 and the object detected signal 410.

The video camera 404 generates a video stream 412 that is received, over a network connection, by a decoder/event detector of the host system 402. The decoder/event detector may detect an event or object. The host system 402 may store the video stream in connection with processing the video stream to perform object detection. The host system 402 may perform object detection through processing the video stream 412 using a neural network 414. If the host system 402 detects an object, the host system 402 may send an object detected signal 410 to the IoT device 406.

The illustrated video recording system 400 performs object detection, but requires that the IoT device 406 have a constant and/or reliable connection to the host system 402, else no object detection can be performed.

Figure 5:
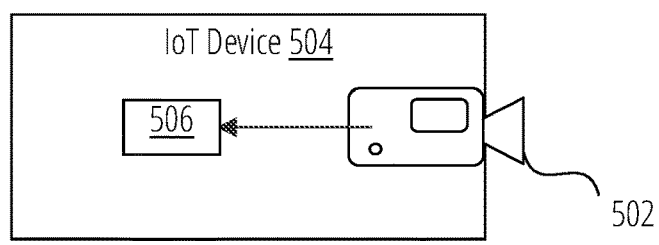
FIG. 5 illustrates a video recording system 500 in accordance with the prior art.
Figure 5:
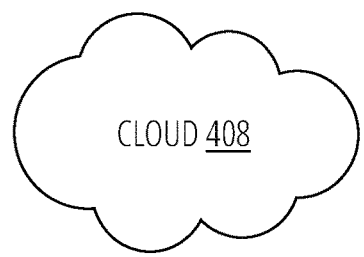

FIG. 5 illustrates a prior art video recording system 500. The video recording system 500 comprises a video camera 502, an IoT device 504, a cloud 408, and a neural network 506. The video camera 502 generate a video stream that is received by logic of the IoT device 504. The IoT device 504 may temporarily or permanently store the video stream.

The IoT device 504 processes the video stream to do object detection using the neural network 506. The IoT device 504 may perform object detection using a neural network 506 with no, or intermittent, connection to a cloud 408 and one or more servers in the cloud 408. The IoT device 504 is limited, however, by having only one single neural network 506, the computing resources available on the IoT device 504, such as processor, memory, size, power source, etc.

Figure 6:
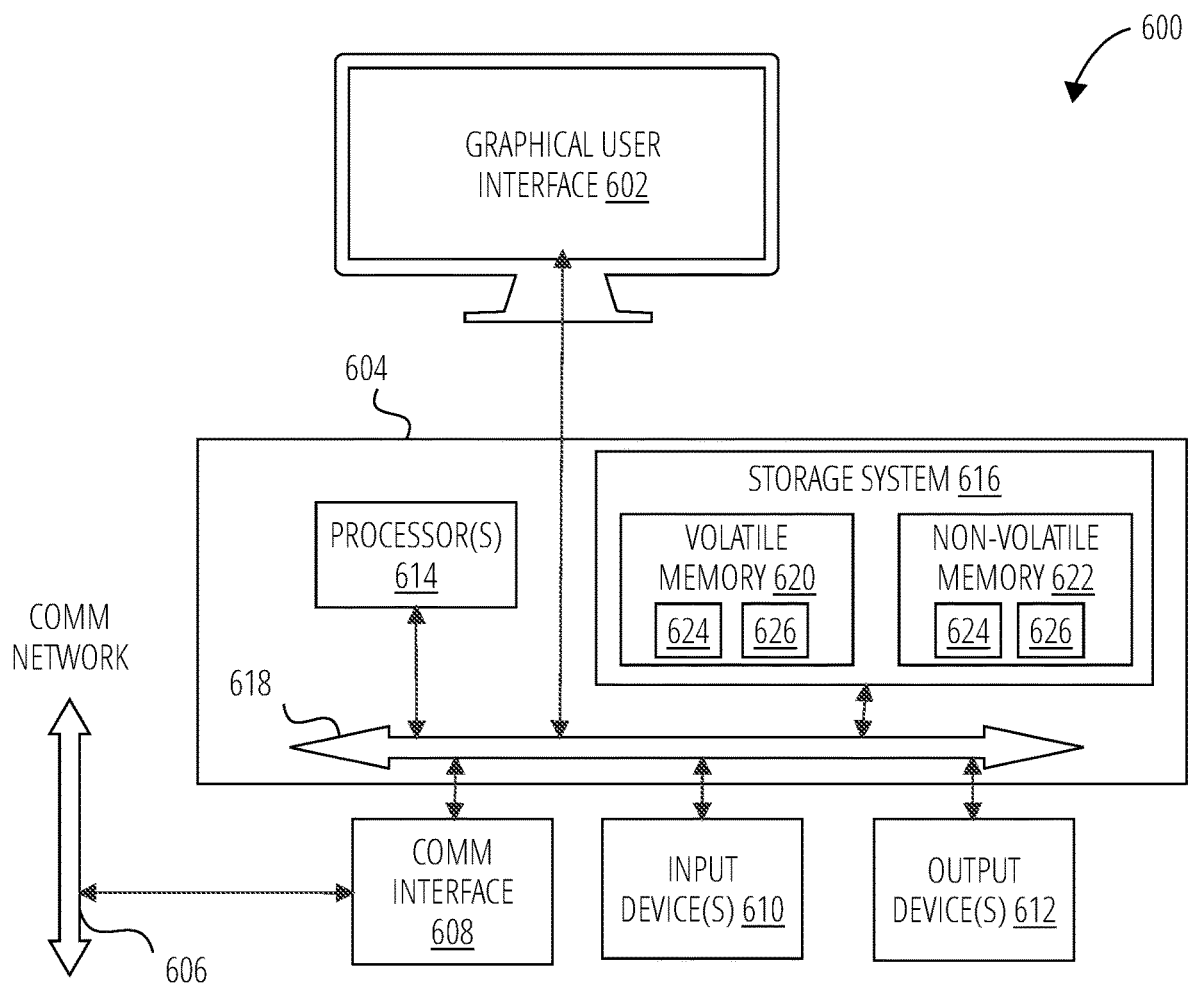
FIG. 6 is an example block diagram of a computing device 600 that may be used in one embodiment.

FIG. 6 is an example block diagram of a computing device 600 that may incorporate embodiments of the claimed solution. FIG. 6 is merely illustrative of a machine system to carry out aspects of the technical processes described herein and does not limit the scope of the claims. One of ordinary skill in the art would recognize other variations, modifications, and alternatives. In certain embodiments, the computing device 600 includes a graphical user interface 602, a data processing system 604, a communication network 606, communication network interface 608, input device(s) 610, output device(s) 612, and the like.

As depicted in FIG. 6, the data processing system 604 may include one or more processor(s) 614 and a storage system 616. "Processor" refers to any circuitry, component, chip, die, package, or module configured to receive, interpret, decode, and execute machine instructions. Examples of a processor may include, but are not limited to, a central processing unit, a general-purpose processor, an application-specific processor, a graphics processing unit (GPU), a field programmable gate array (FPGA), application Specific Integrated Circuit (ASIC), System on a Chip (SoC), virtual processor, processor core, and the like. "Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

The processor(s) 614 communicate with a number of peripheral devices via a bus subsystem 618. These peripheral devices may include input device(s) 610, output device(s) 612, communication network interface 608, and the storage system 616. The storage system 616, In one embodiment, comprises one or more storage devices and/or one or more memory devices. The term "storage device" refers to any hardware, system, sub-system, circuit, component, module, non-volatile memory media, hard disk drive, storage array, device, or apparatus configured, programmed, designed, or engineered to store data for a period of time and retain the data in the storage device while the storage device is not using power from a power supply. Examples of storage devices include, but are not limited to, a hard disk drive, FLASH memory, MRAM memory, a Solid-State storage device, Just a Bunch Of Disks (JBOD), Just a Bunch Of Flash (JBOF), an external hard disk, an internal hard disk, and the like. "Hardware" refers to logic embodied as analog and/or digital circuitry.

In one embodiment, the storage system 616 includes a volatile memory 620 and a non-volatile memory 622. The term "volatile memory" refers to a shorthand name for volatile memory media. In certain embodiments, volatile memory refers to the volatile memory media and the logic, controllers, processor(s), state machine(s), and/or other periphery circuits that manage the volatile memory media and provide access to the volatile memory media.

The term "non-volatile memory" refers to shorthand name for non-volatile memory media. "Non-volatile memory media" refers to any hardware, device, component, element, or circuit configured to maintain an alterable physical characteristic used to represent a binary value of zero or one after a primary power source is removed. In certain embodiments, non-volatile memory media refers to the non-volatile memory media and the logic, controllers, processor(s), state machine(s), and/or other periphery circuits that manage the non-volatile memory media and provide access to the non-volatile memory media. The volatile memory 620 and/or the non-volatile memory 622 may store computer-executable instructions 626 that alone or together form logic 624 that when applied to, and executed by, the processor(s) 614 implement embodiments of the processes disclosed herein. The term "logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Memory" refers to any hardware, circuit, component, module, logic, device, or apparatus configured, programmed, designed, arranged, or engineered to retain data. Certain types of memory require availability of a constant power source to store and retain the data. Other types of memory retain and/or store the data when a power source is unavailable.

"Volatile memory media" refers to any hardware, device, component, element, or circuit configured to maintain an alterable physical characteristic used to represent a binary value of zero or one for which the alterable physical characteristic reverts to a default state that no longer represents the binary value when a primary power source is removed or unless a primary power source is used to refresh the represented binary value. Examples of volatile memory media include but are not limited to dynamic random-access memory (DRAM), static random-access memory (SRAM), double data rate random-access memory (DDR RAM) or other random-access solid-state memory. While the volatile memory media is referred to herein as "memory media," in various embodiments, the volatile memory media may more generally be referred to as volatile memory.

In certain embodiments, data stored in volatile memory media is addressable at a byte level which means that the data in the volatile memory media is organized into bytes (8 bits) of data that each have a unique address, such as a logical address.

"Computer" refers to any computing device. Examples of a computer include, but are not limited to, a personal computer, a laptop, a tablet, a desktop, a server, a main frame, a super computer, a computing node, a virtual computer, a hand held device, a smart phone, a cell phone, a system on a chip, a single chip computer, and the like.

"File" refers to a unitary data structure for storing, retrieving, and communicating data and/or instructions. A file is distinguished from other types of packaging by having associated management metadata utilized by the operating system to identify, characterize, and access the file.

"Module" refers to a computer code section having defined entry and exit points. Examples of modules are any software comprising an application program interface, drivers, libraries, functions, and subroutines. "Computer code section" refers to one or more instructions. "Application program interface" refers to instructions implementing entry points and return values to a module.

"Instructions" refers to symbols representing commands for execution by a device using a processor, microprocessor, controller, interpreter, or other programmable logic. Broadly, 'instructions' can mean source code, object code, and executable code. 'Instructions' herein is also meant to include commands embodied in programmable read-only memories (EPROM) or hard coded into hardware (e.g., 'micro-code') and like implementations wherein the instructions are configured into a machine memory or other hardware component at manufacturing time of a device. "Interpreter" refers to an interpreter is logic that directly executes instructions written in a source code scripting language, without requiring the instructions to a priori be compiled into machine language. An interpreter translates the instructions into another form, for example into machine language, or into calls to internal functions and/or calls to functions in other software modules.

"Source code" refers to a high-level textual computer language that requires either interpretation or compilation in order to be executed by a device. "Object code" refers to the computer code output by a compiler or as an intermediate output of an interpreter. Object code often takes the form of machine language or an intermediate language such as register transfer language (RTL). "Executable code" refers to instructions in a ready-to-execute form by a programmable device. For example, source code instructions in non-interpreted execution environments are not executable code because they must usually first undergo compilation, linking, and loading by the operating system before they have the proper form for execution. Interpreted computer code may be considered executable code because it can be directly applied to a programmable device (an interpreter) for execution, even though the interpreter itself may further transform the interpreted computer code into machine language instructions.

"Operating system" refers to logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application and the application relies on modules of the operating system in most cases, not vice-versa. The operating system also typically intermediates between applications and drivers. Drivers are said to execute "below" the operating system because they intermediate between the operating system and hardware components or peripheral devices. "Driver" refers to low-level logic, typically software, that controls components of a device. Drivers often control the interface between an operating system or application and input/output components or peripherals of a device, for example.

"Software" refers to logic implemented as instructions for controlling a programmable device or component of a device (e.g., a programmable processor, controller). Software can be source code, object code, executable code, machine language code. Unless otherwise indicated by context, software shall be understood to mean the embodiment of said code in a machine memory or hardware component, including "firmware" and micro-code. "Firmware" refers to logic embodied as processor-executable instructions stored on volatile memory media and/or non-volatile memory media.

"Programmable device" refers to any logic (including hardware and software logic) who's operational behavior is configurable with instructions. "Application" refers to any software that is executed on a device above a level of the operating system. An application will typically be loaded by the operating system for execution and will make function calls to the operating system for lower-level services. An application often has a user interface, but this is not always the case. Therefore, the term 'application' includes background processes that execute at a higher level than the operating system.

The input device(s) 610 include devices and mechanisms for inputting information to the data processing system 604. These may include a keyboard, a keypad, a touch screen incorporated into the graphical user interface 602, audio input devices such as voice recognition systems, microphones, and other types of input devices. In various embodiments, the input device(s) 610 may be embodied as a computer mouse, a trackball, a track pad, a joystick, wireless remote, drawing tablet, voice command system, eye tracking system, and the like. The input device(s) 610 typically allow a user to select objects, icons, control areas, text and the like that appear on the graphical user interface 602 via a command such as a click of a button or the like.

The output device(s) 612 include devices and mechanisms for outputting information from the data processing system 604. These may include the graphical user interface 602, speakers, printers, infrared LEDs, and so on, as well understood in the art. In certain embodiments, the graphical user interface 602 is coupled to the bus subsystem 618 directly by way of a wired connection. In other embodiments, the graphical user interface 602 couples to the data processing system 604 by way of the communication network interface 608. For example, the graphical user interface 602 may comprise a command line interface on a separate computing device 600 such as desktop, server, or mobile device.

The communication network interface 608 provides an interface to communication networks (e.g., communication network 606) and devices external to the data processing system 604. The communication network interface 608 may serve as an interface for receiving data from and transmitting data to other systems. Embodiments of the communication network interface 608 may include an Ethernet interface, a modem (telephone, satellite, cable, ISDN), (asynchronous) digital subscriber line (DSL), FireWire, USB, a wireless communication interface such as Bluetooth or WiFi, a near field communication wireless interface, a cellular interface, and the like.

The communication network interface 608 may be coupled to the communication network 606 via an antenna, a cable, or the like. In some embodiments, the communication network interface 608 may be physically integrated on a circuit board of the data processing system 604, or in some cases may be implemented in software or firmware, such as "soft modems", or the like.

The computing device 600 may include logic that enables communications over a network using protocols such as HTTP, TCP/IP, RTP/RTSP, IPX, UDP and the like.

The volatile memory 620 and the non-volatile memory 622 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 620 and the non-volatile memory 622 may be configured to store the basic programming and data constructs that provide the functionality of the disclosed processes and other embodiments thereof that fall within the scope of the claimed solution.

Logic 624 that implements one or more parts of embodiments of the solution may be stored in the volatile memory 620 and/or the non-volatile memory 622. Logic 624 may be read from the volatile memory 620 and/or non-volatile memory 622 and executed by the processor(s) 614. The volatile memory 620 and the non-volatile memory 622 may also provide a repository for storing data used by the logic 624.

The volatile memory 620 and the non-volatile memory 622 may include a number of memories including a main random-access memory (RAM) for storage of instructions and data during program execution and a read only memory (ROM) in which read-only non-transitory instructions are stored. The volatile memory 620 and the non-volatile memory 622 may include a file storage subsystem providing persistent (non-volatile) storage for program and data files. The volatile memory 620 and the non-volatile memory 622 may include removable storage systems, such as removable flash memory.

The bus subsystem 618 provides a mechanism for enabling the various components and subsystems of data processing system 604 communicate with each other as intended. Although the communication network interface 608 is depicted schematically as a single bus, some embodiments of the bus subsystem 618 may utilize multiple distinct busses.

It will be readily apparent to one of ordinary skill in the art that the computing device 600 may be a device such as a smartphone, a desktop computer, a laptop computer, a rack-mounted computer system, a computer server, or a tablet computer device. As commonly known in the art, the computing device 600 may be implemented as a collection of multiple networked computing devices. Further, the computing device 600 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

Figure 7:
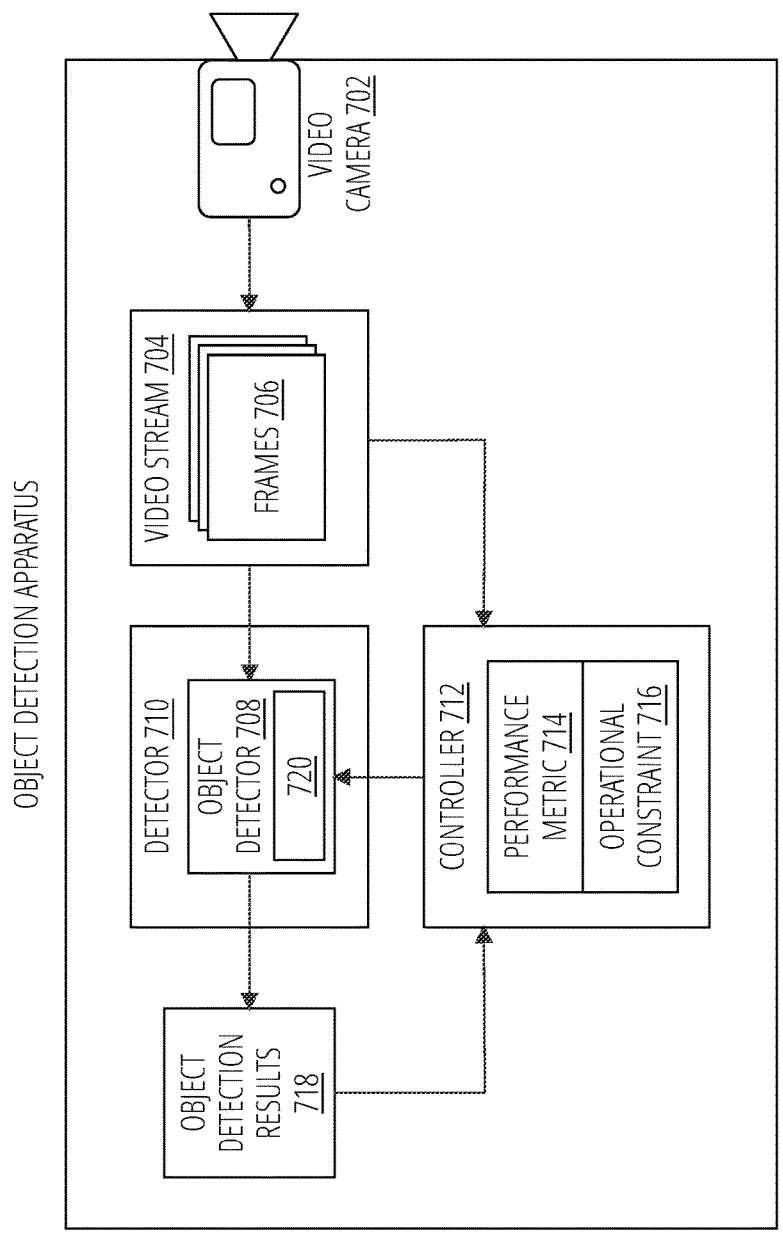
FIG. 7 illustrates an object detection apparatus 700 in accordance with one embodiment.

FIG. 7 illustrates an object detection apparatus 700 in accordance with one embodiment. The object detection apparatus 700 comprises a video camera 702 configured to generate a video stream 704 comprising a plurality of frames 706. The object detection apparatus 700 further comprises an object detector 708 as part of a detector 710 configured to accept the video stream 704 as input data with which to perform object detection. These elements may comprise a detection layer of the object detection apparatus 700.

The control layer of the object detection apparatus 700, in one embodiment may comprise a controller 712 which may be coupled to the object detector 708. The controller 712 may be configured to manage the detector 710 and/or the object detector 708 to control and/or manage object detection in order to satisfy a performance metric 714 and/or to operate within an operational constraint 716. In this manner, the controller 712 may manage available computing resources and power resources of the object detection apparatus 700 in relation to performance needed to achieve a desired set of object detection results 718. "Object detection result" refers to an output from an object detector. In different embodiments, an object detection result may have various forms. For example, in one embodiment, an object detection result may comprise one or more object labels and one or more associated classification percentages indicating the probability that an object detector has correctly labeled an identified object. In the same, or different examples, an object detection result may include a latency for completing an object detection (e.g., where the object detector is a neural network, performing an object detection inference), one or more bounding boxes and/or masks marking identified objects, an indicator whether any objects are detected, a measure of an amount of computing resources used to perform object detection for a single frame, and the like. Object detection results may be used to compare performance of one object detector versus another object detector.

"Performance metric" refers to a measure, quantity, or value established such at performance of an operation that meets or exceeds the performance metric satisfies the performance metric. In certain embodiments, it may be desirable for performance of an operation to be at or below a performance metric. Examples of a performance metric include but are not limited to, an accuracy target, an accuracy target range, a latency threshold, an electrical power use level, a memory use level, and the like.

"Operational constraint" refers to one or more limits, conditions, or restrictions on an operation, function, or feature. Examples of an operational constraint include, but are not limited to, electric power available, processing capacity, bandwidth, volatile memory available, storage available, and the like.

The object detector 708 may comprise any logic configured to identify an object or event in the frames. In certain embodiments, the object detector 708 may comprise a neural network 720. The neural network 720 may be trained for object detection before use in the object detection apparatus 700.

In one embodiment, the controller 712 may manage the object detector 708 such that a minimal level of performance is achieved, while making most efficient use of the computing resources of the object detection apparatus 700. For example, in one embodiment, suppose the object detector 708 includes a neural network 720 that is configurable to use more or fewer hidden layers based on a configuration setting. In such an embodiment, the controller 712 may adjust the configuration setting to use more or fewer hidden layers based on computing resources available. For example, if sufficient power is available and a certain performance metric is for competing object detection as quickly as possible, with the highest level of accuracy available, the controller may adjust a configuration setting such that the neural network 720 uses all of the hidden layers, for high accuracy, but at a lower level of computation precision, facilitate getting an output sooner.

Figure 8:
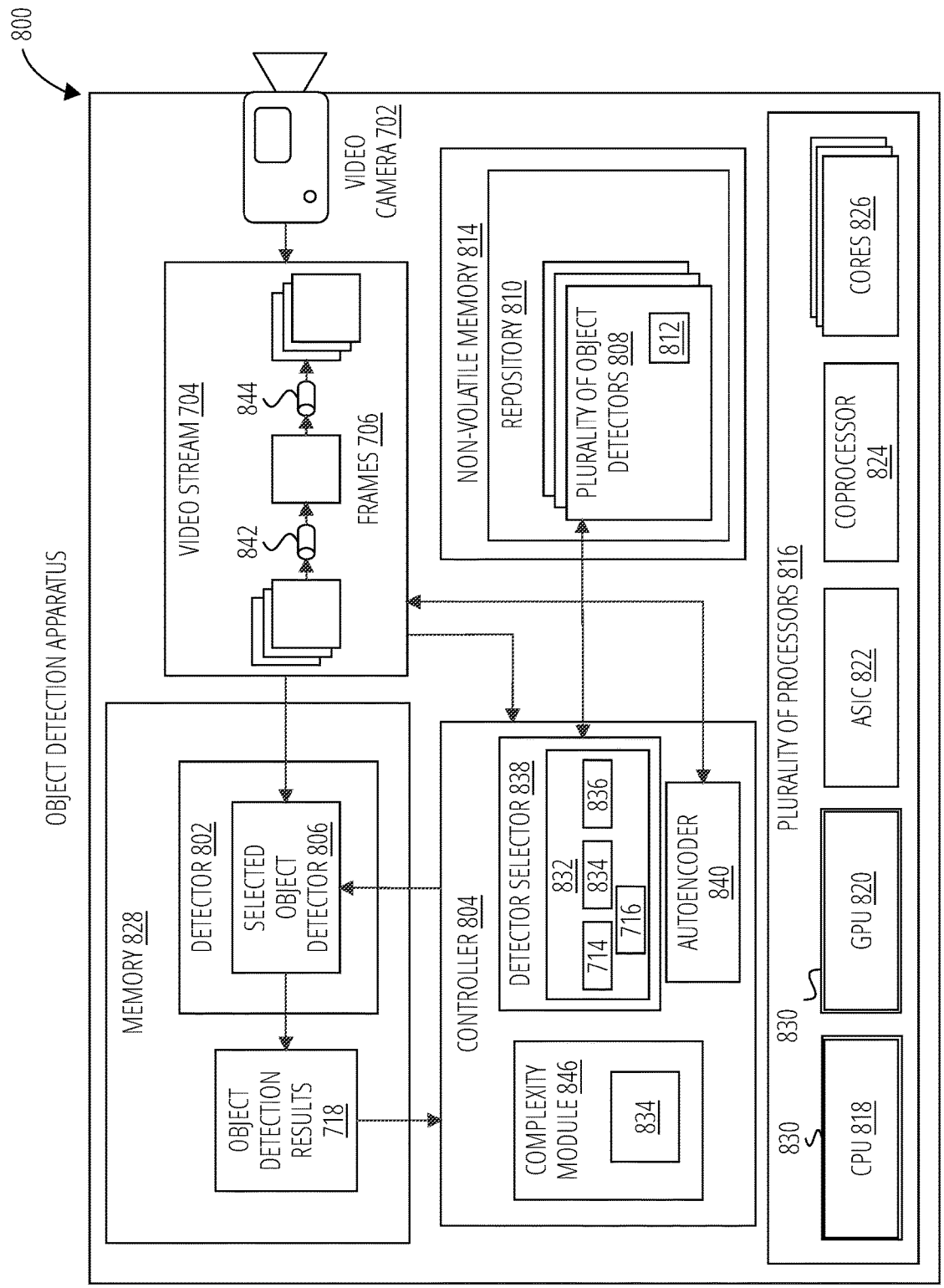
FIG. 8 illustrates an object detection apparatus 800 in accordance with one embodiment.

FIG. 8 illustrates an object detection apparatus 800 in accordance with one embodiment. The object detection apparatus 800 incorporates many aspects of the embodiment illustrated in FIG. 7.

In this embodiment, the object detection apparatus 800 includes a detector 802 and a controller 804 configured to enable changing an object detector based on different conditions, parameters, or attributes. Specifically, the detector 802 incorporates a selected object detector 806 by which the controller 804 manages object detection and obtains object detection results 718.

The selected object detector 806 may be selected from a plurality of object detectors 808 stored within a repository 810. "Repository" refers to any data source or dataset that includes data, or content. In one embodiment, a repository resides on a computing device. In another embodiment, a repository resides on a remote computing or remote storage device. A repository may comprise a file, a folder, a directory, a set of files, a set of folders, a set of directories, a database, an application, a software application, content of a text, content of an email, content of a calendar entry, and the like. A repository, in one embodiment, comprises unstructured data. A repository, in one embodiment, comprises structured data such as a table, an array, a queue, a look up table, a hash table, a heap, a stack, or the like. A repository may store data in any format including binary, text, encrypted, unencrypted, a proprietary format, or the like. The repository 810 may be incorporated within a control layer.

Each object detector of the plurality of object detectors 808 may have different attributes 812 relative to the other object detectors in the plurality of object detectors 808. "Attribute" refers to any property, trait, aspect, quality, data value, setting, or feature of an object or thing. In embodiments of the claimed solution, attribute refers to properties of an object detector and may include, but is not limited to, an accuracy level for the object detector, a latency for the object detector between receiving input(s) and providing an output (e.g., an inference result, an object detection prediction), a measure of an amount of memory resources the object detector uses, a measure of a resolution level for an image or frame provided as input to the object detector, a measure of an amount of processor resources the object detector uses, a measure of the number of computations the object detector performs per unit of time, such as seconds, and the like.

Where the object detector comprises a neural network, the attribute(s) of the object detector may include, but are not limited to, a type of neural network, a number of layers of the neural network, a number of nodes of the neural network, a number and/or type of interconnection between nodes of the neural network, a number of parameters used in the neural network, a number of floating point operations (FLOPs) for the neural network, and the like.

Where the object detector comprises a neural network, object detectors may be compared based on attributes for each object detector. In certain embodiments, object detectors in the form of neural networks may be compared, at a high level, using a rough comparison reference to size or weight. Generally, these size or weight comparisons of neural networks may be used to compare the neural networks based on a collection of attributes that relate to tradeoffs between one or more performance metrics and one or more operational constraints.

For example, an object detector/neural network may be described as heavy, heavyweight, large, thick, or fat and have the attributes of having a relatively high number of nodes, high number of layers, high FLOPs, high memory usage, and/or high computational latency, in exchange for higher accuracy of object detection.

In contrast and by comparison, another object detector/neural network may be described as light, lightweight, small, thin, or lean and have the attributes of having a relatively small/low number of nodes, small/low number of layers, small/low FLOPS, small/low memory usage, and/or small/low computational latency, in exchange for lower accuracy of object detection.

Where the object detector comprises a neural network, and a convolutional neural network in particular, the attribute(s) may also be referred to as "hyperparameters" and may include aspects such as a number of total layers to use in the neural network, a number of convolution layers, filter sizes, values for strides at each layer, the group size of the convolution layers, the type of the activation layers, and/or the like. "Latency" refers to a delay between when an operation starts and when the operation completes.

The controller 804 leverages the different attributes 812 of the plurality of object detectors 808 to choose an object detector that balances one or more performance metrics with one or more operational constraints. The chosen object detector becomes the selected object detector 806. In the depicted embodiment, the detector 802 and/or the controller 804 is/are configured to change the object detector as needed. Consequently, the object detection apparatus 800 is configured to dynamically adjust to a) the hardware available in the object detection apparatus 800, b) performance metrics, c) changes in performance metrics, d) current operational constraints, e) environment conditions, and/or f) a change in operational constraints.

The differing attributes 812, in one embodiment, may relate to the weight of the neural network employed by the object detector, which may in turn determine the processing and power needs of the selected object detector 806. The repository 810 of the plurality of object detectors 808 may be stored in non-volatile memory 814 within the object detection apparatus 800. The repository 810 may comprise any of a variety of data structures or systems, including but not limited to a file system, an operating system, a database, a set of files, or the like.

The object detection apparatus 800 may further comprise a plurality of processors 816 coupled to the controller 804. The plurality of processors 816 may be configured to execute the logic, or some portion of the logic, of the selected object detector 806 to perform object detection. The plurality of processors 816 may include a central processing unit 818 (CPU), a graphics processing unit 820 (GPU), an application-specific integrated circuit 822 (ASIC), a coprocessor 824, a number of processor cores 826, or any of a combination of these hardware elements. Each type of processor may have specific performance parameters and power usage. The parameters and power usage requirements may make one of the plurality of processors 816 better suited than another for different object detection needs, and the controller 804 may select among the plurality of processors 816 in order to provide the highest performance needed with the lowest power consumption.

The object detection apparatus 800 may incorporate a memory 828 coupled to the controller 804. The memory 828 may be configured to store data for the selected object detector 806. The controller 804 may be configured to choose one of the plurality of object detectors 808 to act as the selected object detector 806 based on the availability of the plurality of processors 816, the type of each available processor, and an amount of memory space available in the memory 828 for the object detection. "Available processor" refers to a processor having the capabilities for performing object detection computations and having a workload of a size that permits the available processor to perform one or more computations for an object detection operation.

Availability of a processor for doing object detection may be impacted by several factors. For example, certain processors may not be available because they may not be present in a particular hardware configuration of the object detection apparatus 800. Other processors may be present in the object detection apparatus 800, but may be busy doing other computations for the object detection apparatus 800 and may therefore not be available processors for one or more object detection tasks. Still other processors may be available to perform computations, but may not be configured to perform the kinds and types of computations required for object detection. The controller 804 may weigh one or more of these aspects in determining which object detector to use as the selected object detector 806.

In one embodiment, the controller 804 may determine that two or more processors are available processors 830. Based on the type and number of available processors 830, the controller 804 may choose one object detector rather than another. For example, if a central processing unit 818 and a graphics processing unit 820 are available processors 830, the controller 804 may select an object detector that uses more processing cycles and is more accurate, because the hardware is available.

The controller 804 may review multiple factors 832 in determining which object detector of the plurality of object detectors 808 to select. In certain embodiments, the factors 832 may also be used to determine whether or not to change the selected object detector 806. The one or more factors 832 may comprise one or more performance metrics 714, one or more operational constraints 716, the object detection results 718, information about available processors, a complexity level 834 for one or more frames, environment conditions 836, and the like. "Environment condition" refers to a condition influenced by, determined by, or measured in relation to an environment in which an apparatus or device operates. Examples of an environment condition include, but are not limited to, a time of day, a weather condition, a season, a time of year, a lighting conditions, a visibility conditions, and the like.

A detector selector 838 of the controller 804 reviews the factors 832 and the attributes 812 to make a determination as to which object detector is the selected object detector 806. In one embodiment, the detector selector 838 may chose an object detector that performs object detection the fastest and most accurately, while using minimal computing resources. Alternatively, the detector selector 838 may include logic that favors one factor over another in order to meet one or more performance metrics for the object detection apparatus 800 within one or more operational constraints.

Certain factors 832 may change over time or through use of the object detection apparatus 800. For example, suppose the object detection apparatus 800 comprises an outdoor security video camera, environment conditions 836 may change as weather changes. Given certain weather conditions, the frames may include too much interference from weather to support object detection. In such an example, the detector selector 838 may choose a lightweight object detector as the selected object detector 806. Alternatively, or in addition, the detector selector 838 may shut down or turn off the selected object detector 806 during poor weather environment conditions 836.

In one embodiment, a complexity level 834 of the plurality of frames 706 may change over time. For example, more or fewer objects such as people, animals, or things may enter or exit the view of the video camera 702. Or, the video camera 702 may pan or zoom such that more, less or different objects enter or exit the view of the video camera 702.

The controller 712 may manage object detection based on an original complexity level 834 or the changed complexity level 834 of the plurality of frames 706 within the video stream 704. An autoencoder 840 may be incorporated within the controller 804. "Autoencoder" refers to a hardware, software, firmware, circuitry, electronic component, module, logic, device, or apparatus configured, programmed, designed, arranged, or engineered to encode an input image or frame into a bottleneck for use in comparison with one or more adjacent images or frames in a sequence to determine how much a scene changes in the images or frames. In certain embodiments, an autoencoder comprises a neural network having an encoder that generates the bottleneck from an input image/frame and a decoder configured to reconstruct the input image/frame from the bottleneck.

"Bottleneck" refers to an output from an autoencoder after evaluating a single frame. In certain embodiments, a difference in values of a bottleneck between frames of a video stream may be used to determine a complexity level for video flow in the video stream. In one embodiment, the greater the difference, the higher the complexity level and the lower the difference, the lower the complexity level.

The autoencoder 840 may be configured to determine a bottleneck 842 for each of two adjacent frames of the video stream 704, as well as a bottleneck 844 for two subsequent adjacent frames, and so on. The controller 804 may further incorporate a complexity module 846 configured to determine a complexity level 834 for the plurality of frames 706 based on a difference between bottlenecks of adjacent frames of the video stream 704 (e.g., the difference between bottleneck 842 and bottleneck 844, etc.).

In another example, performance metrics 714 may change over time, or based on a time of day. For example, with the object detection apparatus 800 implemented as a security video camera, the object detection apparatus 800 may do minimal object detection or very coarse (less accurate) object detection during day time hours when people may be providing security services and do more accurate and computationally demanding object detection at nighttime, when fewer people may be available to provide security. In such an example, the detector selector 838 may change the selected object detector 806 as the time transitions from daytime hours to nighttime hours to meet a changing performance metric 714.

The controller 804 may further comprise the detector selector 838. The controller 804 may use the factors 832 both to determine when to activate the detector selector 838 to potentially change the selected object detector 806 and the factors 832 may be used by the detector selector 838 to determine which object detector to use as a replacement selected object detector 806. Of course, other inputs may influence both when detector selector 838 is activated and/or which object detector becomes the selected object detector 806. Such inputs may include, the time or day, a weather report, a power supply level, user input, an amount of available data storage capacity, and the like.

The controller 804 may manage object detection by activating the detector selector 838 to swap the selected object detector 806 for another object detector selected from the plurality of object detectors 808 based on one or more factors 832. The plurality of object detectors 808 in the repository 810 may include different types of NN-based detectors. Some detectors may be more lightweight than others. Lightweight NN detectors may occupy less data storage space and perform object detection faster but less accurately. The detector selector 838 may communicate with the detector 802 to replace a current selected object detector 806 with another selected object detector 806 from the plurality of object detectors 808.

Figure 9:
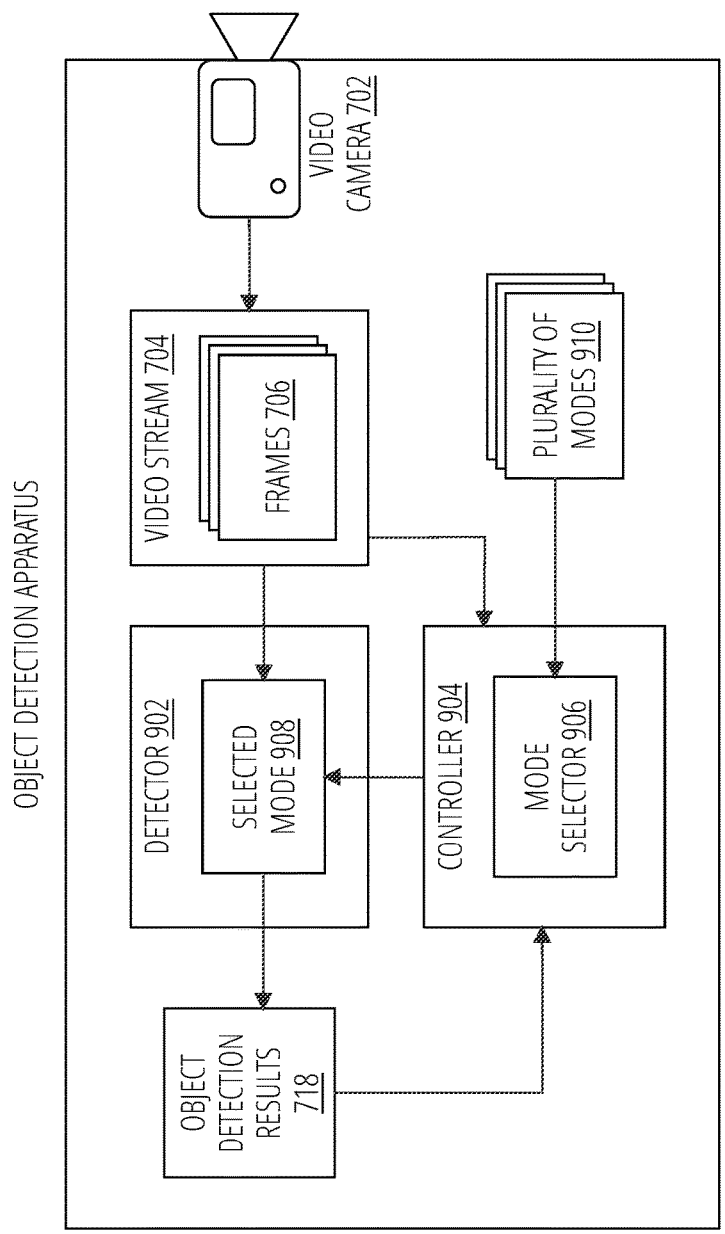
FIG. 9 illustrates an object detection apparatus 900 in accordance with one embodiment.

FIG. 9 illustrates an object detection apparatus 900 in accordance with one embodiment comprising a detector 902 and a controller 904. In this embodiment, the controller 904 comprises a mode selector 906. The controller 904 may thus manage object detection by activating the mode selector 906 to choose a selected mode 908 for the detector 902 from a plurality of modes 910.

In one embodiment, the plurality of modes 910 may refer to a single type of NN-based object detector operated in different modes. The availability of multiple modes may depend on the hardware and/or the detector 902. For example, the object detection apparatus 900 may operate in CPU mode, GPU mode, FPGA mode, ASIC mode, high power mode, lower power node, high precision mode, low-precision mode, etc. These different modes may have different advantages and disadvantages.

For example, GPU mode may run faster but consume more power. ASIC mode may consume less power but may be slower. Low-precision mode may run faster with the same power consumption but may be less accurate. The mode selector 906 may use available information, including the video stream 704 input, the object detection results 718, and/or factors 832 to determine which mode to select. The mode selector 906 may then signal the detector 710 to operate in the selected mode 908 for object detection.

For detections of two adjacent video frames/sound clips, the controller 904 may compare the difference between. Particularly, for video, the controller 904 may compare coordinates of the two bounding boxes of the same detected objects to calculate how much the captured image moves, pixelwise. Also, a count may be made of how many objects appear or disappear. This count may be used to generate a complexity score as described by Equation 2. Those of skill in the art will appreciate that Equations 2 and 3 are examples of many types or forms of logic or algorithms that may be used with the claimed embodiments to determine the complexity score.

$$S_D \in [0,1] \quad \text{Equation 2}$$

A final complexity score may be calculated based on a weighted average of $S_V$ from Equation 1 and $S_D$ from Equation 2, as represented by Equation 3 below.

$$S = \alpha_V S_V + (1 - \alpha_V) S_D, \alpha_V \in [0,0] \quad \text{Equation 3}$$

where $\alpha_V$ may be tuned based on how much one wishes to select the mode (or a selected object detector as in object detection apparatus 800) based on raw flow versus object detection results 718. This complexity score S may then be used by the controller 904 (controller 804 in the embodiment of FIG. 8) in decision making.

Figure 10:
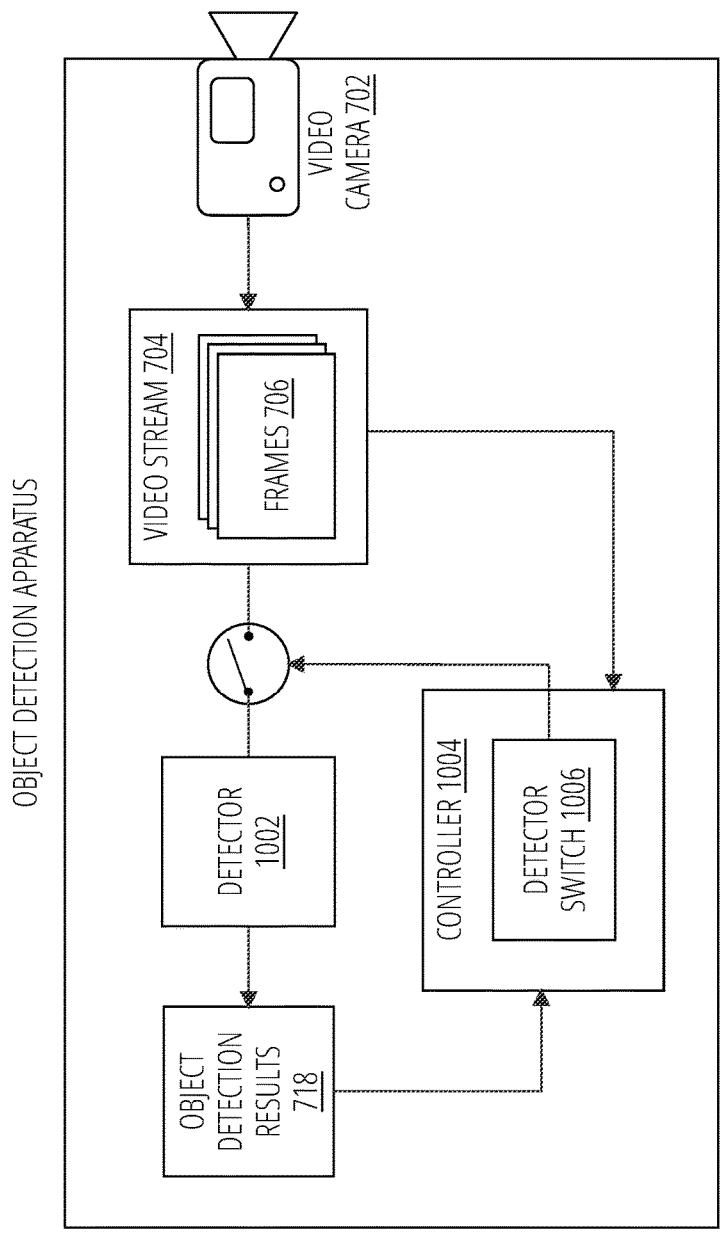
FIG. 10 illustrates an object detection apparatus 1000 in accordance with one embodiment.

FIG. 10 illustrates an object detection apparatus 1000 in accordance with one embodiment comprising a detector 1002, controller 1004, and detector switch 1006. The controller 1004 may manage the detector switch 1006, in this embodiment. The controller 1004 may manage the detector switch 1006 by way of factors such as the factors 832 described above in relation to FIG. 8. The one or more factors used, in this embodiment, may comprise one or more performance metrics 714, one or more operational constraints 716, the object detection results 718, information about available processors, a complexity level 834 for one or more frames, environment conditions 836, and the like. Based on the factors, the controller 1004 may thus manage object detection in a binary manner by activating the detector switch 1006 to turn the detector 1002 on or off.

Such an embodiment may be advantageous where an IoT device includes minimal hardware, lower available power supply, and lower cost for fabrication. This configuration may be employed where both the type of object detectors and the object detector modes are restricted to a single object detector and mode. When the detector 1002 is turned off, no object detection is performed, which saves power. In certain embodiments, the video camera 702 may continue to capture a video stream 704, which may be stored for later analysis.

Figure 11:
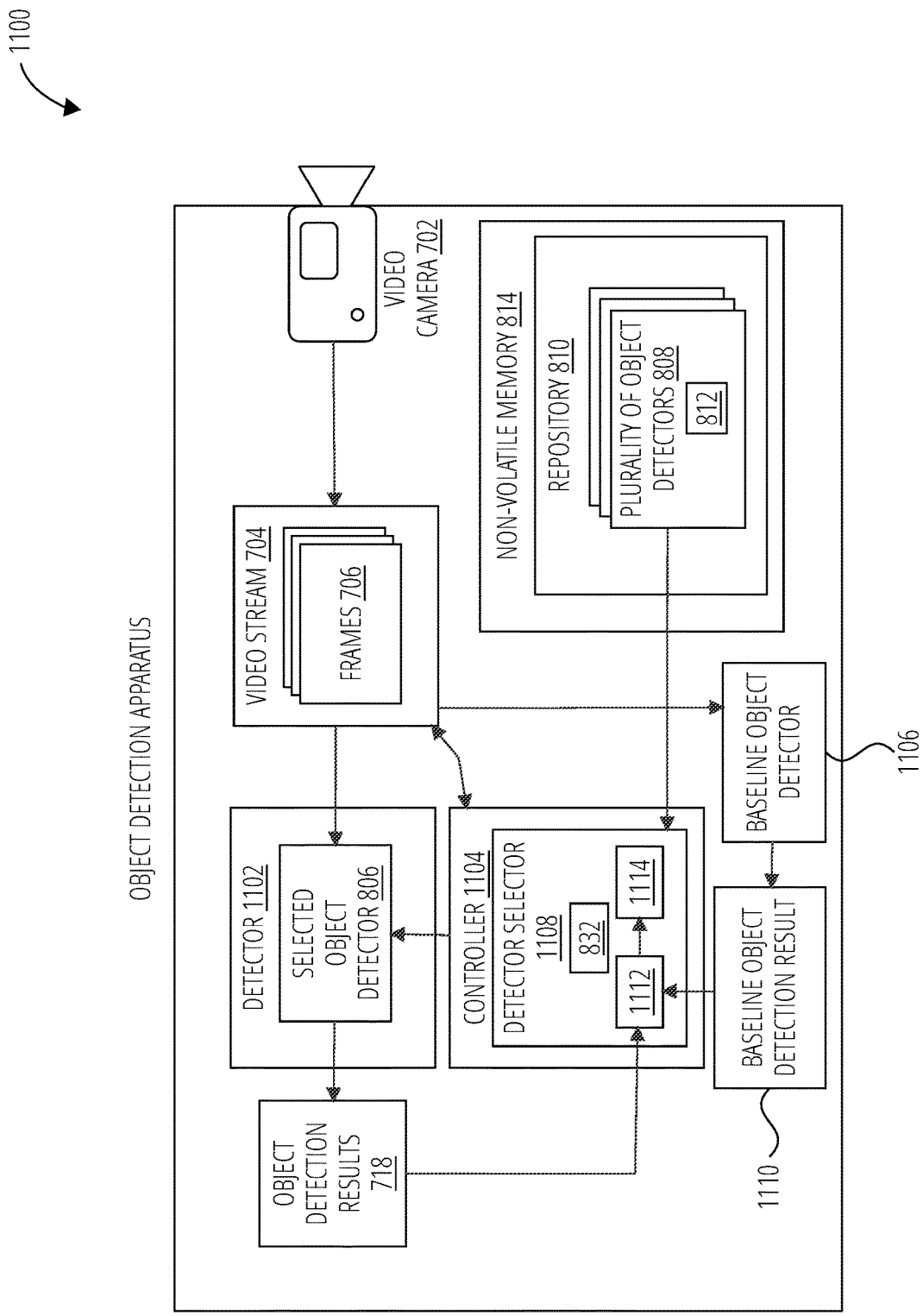
FIG. 11 illustrates an object detection apparatus 1100 in accordance with one embodiment.

FIG. 11 illustrates an object detection apparatus 1100 in accordance with one embodiment comprising detector 1102, controller 1104, a baseline object detector 1106, and a detector selector 1108. The detector 1102 may operate and be configured similar to the detector 802 of FIG. 8.

The controller 1104 may operate and be configured similar to the controller 804 of FIG. 8. In the illustrated embodiment, however, the controller 1104 may be configured to manage the video stream 704 such that the plurality of frames 706 are directed to the baseline object detector 1106 for a period of time or to a selected object detector 806. In this manner, the controller 1104 may be configured to generate a baseline object detection result 1110 using the baseline object detector 1106.

In one embodiment, a detector selector 1108 may reference the factors 832 to determine when to operate the baseline object detector 1106 and when to operate a selected object detector 806. The detector selector 1108 may operate and be configured similar to the detector selector 838 of FIG. 8. In one embodiment, the detector selector 1108 may operate the baseline object detector 1106 when the object detection apparatus 1100 first powers on in order to generate a baseline object detection result 1110 for use in determining a selected object detector 806.

"Baseline object detector" refers to an object detector configured to produce an object detection result of acceptable accuracy and quality. "Baseline object detection result" refers to object detection result produced by a baseline object detector that serves as a standard, a measure, a threshold, or a baseline against which object detection results from other object detectors may be compared.

Once generated, the controller 1104 may use the baseline object detection result 1110 in order to determine which object detector to select from the plurality of object detectors 808. In one embodiment, the baseline object detector 1106 is an object detector chosen from among the plurality of object detectors 808. In another embodiment, the baseline object detector 1106 may be specifically designed for use during a short period of time to generate a baseline object detection result 1110, but not be configured for more routine use as a selected object detector 806.

The detector selector 1108 may include a comparator 1112. The comparator 1112 is configured to measure the object detection results 718 against one or more baseline object detection results 1110 and generate a performance score 1114 for a selected object detector 806 in relation to the baseline object detection result 1110. "Performance score" refers to a measure of how well a first object detector satisfies one or more performance metrics when compared to how well a second object detector satisfies the same one or more performance metrics. In certain embodiments, a performance score may reflect a comparison of two object detectors in relation to one or more performance metric as well as how the two object detectors compare in relation to one or more operational constraints.

The detector selector 1108 may be further configured to change the selected object detector 806 to another object detector from the plurality of object detectors 808 based on the performance score 1114. In one embodiment, the baseline object detector 1106 may be one of the plurality of object detectors 808. In one embodiment, the detector selector 1108 may be configured to operate a selected object detector 806 more often than the baseline object detector 1106, in particular where the baseline object detector 1106 uses more computing resources than the selected object detector 806.

In a design such as the one illustrated here, a full-scale neural network (NN) detector (e.g., baseline object detector 1106) may be operated less frequently in the background while a lighter-weight object detector chosen by the controller 1104 runs in real time. In this manner, the full-scale NN detector may perform as the baseline object detector 1106 and the lightweight NN detector may perform as the selected object detector 806. The baseline object detection result 1110 may be compared with the object detection results 718 when available, and the difference between the two may indicate how much performance quality may be lost when using the selected object detector 806. This difference may be converted to the performance score 1114. The controller 1104 may use the performance score 1114 to decide whether or not to continue using the selected object detector 806 or to choose a heavier or lighter object detector from the plurality of object detectors 808.

Figure 12:
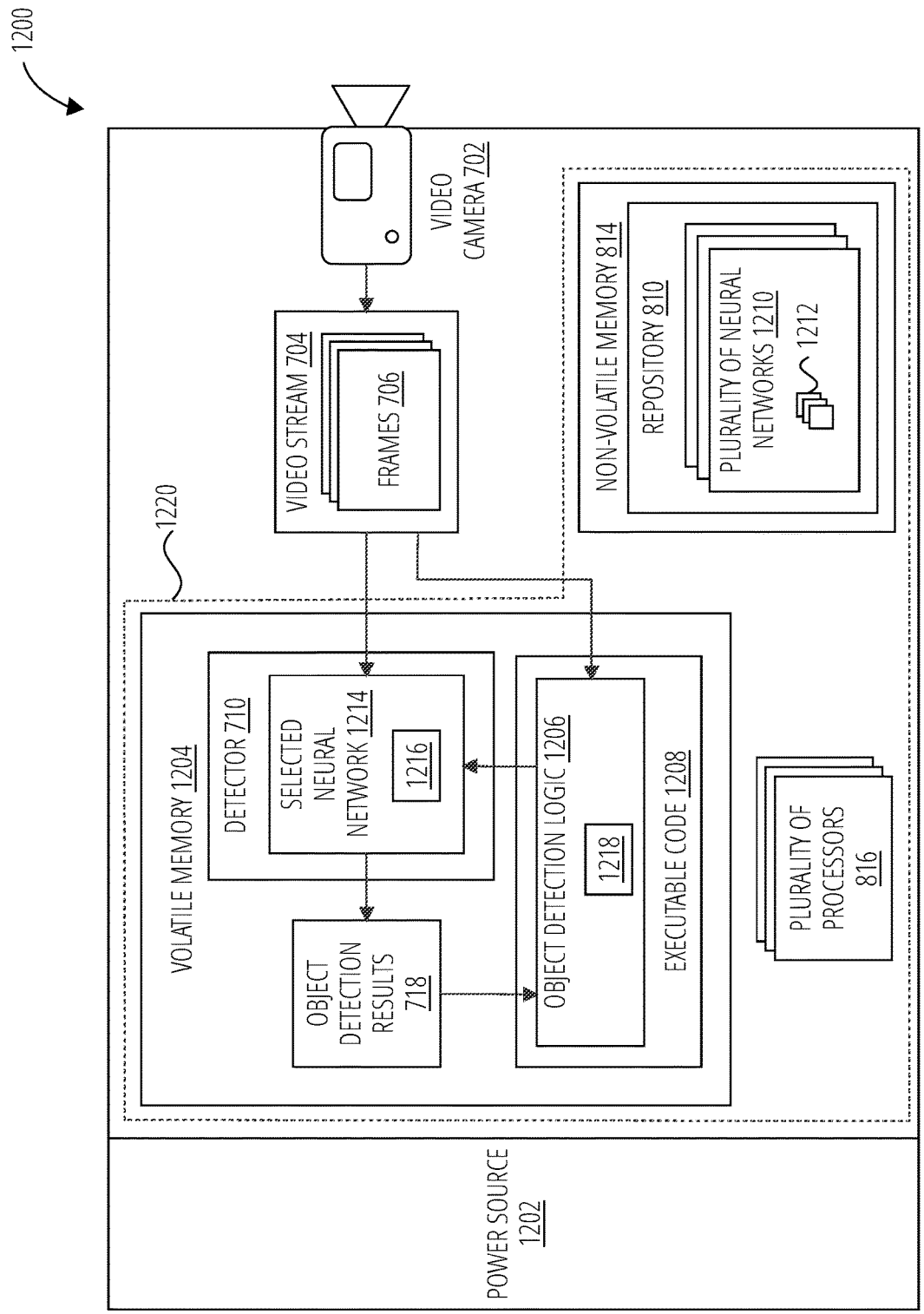
FIG. 12 illustrates an object detection system 1200 in accordance with one embodiment.

FIG. 12 illustrates an object detection system 1200 in accordance with one embodiment. The object detection system 1200 comprises a power source 1202, a video camera 702, a plurality of processors 816, volatile memory 1204, and non-volatile memory 814. The power source 1202 may be configured to supply electrical power to the video camera 702, the plurality of processors 816, the volatile memory 1204, and the non-volatile memory 814. "Power source" refers to a source of electric current and/or voltage. In certain embodiments a power source may comprise an alternating current (AC) power source. In other embodiments a power source may comprise direct current (DC) power source. In other embodiments, a power source may comprise a system or device configured to supply electric current and/or voltage using one of an AC power source, a DC power source, or a combination of both.

The video camera 702 may be configured to generate a video stream 704 comprising a plurality of frames 706. The plurality of processors 816 may be configured to execute object detection logic 1206 to perform object detection on the plurality of frames 706. The volatile memory 1204 may be configured to store data and executable code 1208 for the object detection logic 1206. "Object detection logic" refers to logic configured to perform one or more object detection operations.

The non-volatile memory 814 may be configured to store a plurality of neural networks 1210, each neural network comprising different attributes 1212. The object detection logic 1206 may be configured to operate a selected neural network 1214, chosen from the plurality of neural networks 1210, in real-time to generate object detection results 718. The object detection logic 1206 may be further configured to determine the selected neural network 1214 based on attributes 1212 of the selected neural network 1214, a plurality of performance metrics, and/or a plurality of operational constraints.

In one embodiment, the object detection logic 1206 may be configured to change the selected neural network 1214 in response to object detection results 718 failing to satisfy one of the performance metrics and/or operational constraints. Changing the selected neural network 1214 may include selecting a different neural network as well as adjusting or revising existing neural networks. Changing the selected neural network 1214 may also entail changing the operating mode 1216 for the selected neural network.

"Operating mode" refers to a mode for operating an object detector. Where an object detector comprises a neural network, an operating mode may include using a particular type of processor, accepting frame of a particular image resolution, performing calculations with a particular level of precision, and the like.

The object detection logic 1206 may comprise trigger logic 1218. "Trigger logic" refers to logic configured to signal or initiate a particular action, event, or operation, in response to a condition for the trigger being satisfied. The trigger logic 1218 may be configured to direct the object detection logic 1206 to replace the selected neural network 1214 with another neural network from the plurality of neural networks 1210 in response to a change in complexity level for the plurality of frames 706 of the video stream 704 or a change in one or more operational constraints. The object detection logic 1206 may use the trigger logic 1218 to determine when to determine whether or not to change the selected neural network 1214 to another neural network from the plurality of neural networks 1210.

The object detection logic 1206 may also be configured to select the selected neural network 1214 to perform object detection based on computing resources 1220 available for object detection within the system. "Computing resources" refers to hardware, software, firmware, circuit, electronic component, module, logic, device, or apparatus configured, programmed, designed, arranged, or engineered to conduct computing operations. Examples of computing resources include, but are not limited to, memory, processor(s), data busses, controller(s), control busses, communication busses, networks, communication bandwidth, timing clocks, and the like.

Figure 13:
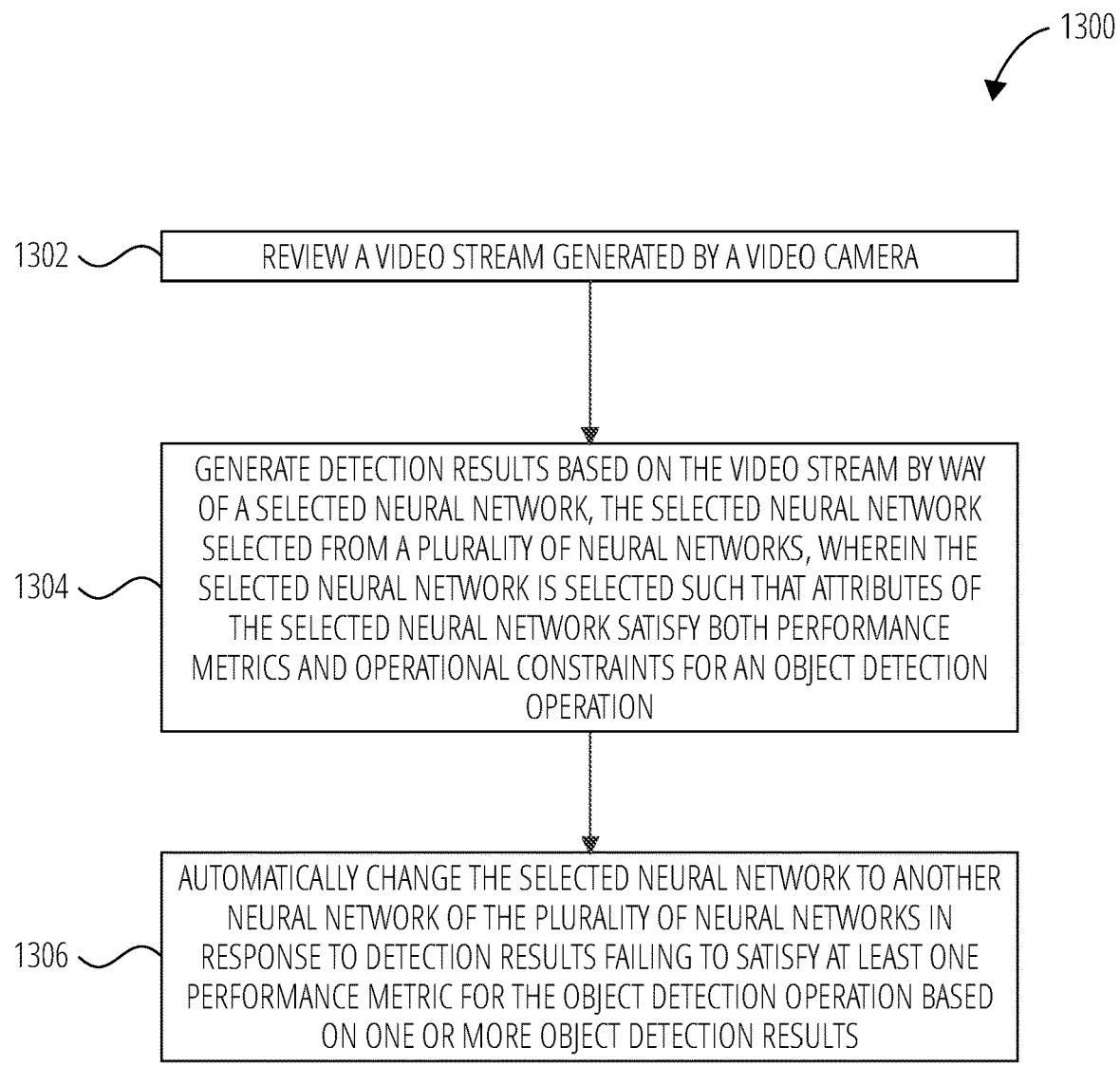
FIG. 13 illustrates a routine 1300 in accordance with one embodiment.

FIG. 13 illustrates a routine 1300 for object detection in accordance with one embodiment. To begin, in block 1302, an object detector and/or a controller may review a video stream generated by a video camera.

In block 1304, the object detector may generate detection results based on the video stream by way of a selected neural network. The selected neural network may be chosen from a plurality of neural networks, such that the attributes of the selected neural network satisfy both performance metrics and/or operational constraints for an object detection operation.

In block 1306, the controller may automatically change the selected neural network to another neural network of the plurality of neural networks in response to the detection results from block 1304 failing to satisfy a performance metric for the object detection operation based on one or more detection results. Changing the selected neural network may in some embodiments include changing an operating mode of the neural network.

In one embodiment, a system is provided that supports object detection within video frames. The system, in one embodiment, includes a means for reviewing a video stream generated by a video camera. The means for reviewing a video stream, in various embodiments, may include controller 712, detector 710, computing resources 1220, or the like.

The system may further include means for generating detection results based on the video stream by way of a selected neural network, the selected neural network selected from a plurality of neural networks, wherein the selected neural network is selected such that attributes of the selected neural network satisfy performance metrics and/or operational constraints for an object detection operation and means for automatically changing the selected neural network to another neural network of the plurality of neural networks in response to object detection results failing to satisfy at least one performance metric for the object detection operation based on one or more object detection results.

The means for generating detection results based on the video stream by way of a selected neural network and means for automatically changing the selected neural network to another neural network of the plurality of neural networks in various embodiments, may include detector 710, object detector 708, selected object detector 806, plurality of object detectors 808, selected mode 908, selected neural network 1214, controller 712, computing resources 1220, or the like.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C. § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc., are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. An apparatus, comprising:
a video camera configured to generate a video stream of frames;
an object detector configured to accept the video stream as input data and to perform object detection; and
a controller comprising a detector selector and coupled to the object detector, the controller configured to:
activate the detector selector to swap the object detector with another object detector selected from a plurality of object detectors within a repository based on one or more factors; and
manage the object detection in order to satisfy a performance metric and operate within an operational constraint.

2. The apparatus of claim 1, wherein the object detector comprises:
a selected object detector selected from a plurality of object detectors stored within a repository, each object detector of the plurality of object detectors comprising different attributes relative to other object detectors of the plurality of object detectors; and
wherein the controller is further configured to manage the object detection using the selected object detector.

3. The apparatus of claim 2, further comprising:
a plurality of processors coupled to the controller, the plurality of processors configured to execute logic of the selected object detector to perform the object detection;
a memory coupled to the controller, the memory configured to store data for the selected object detector; and
wherein the controller is further configured to select one of the plurality of object detectors as the selected object detector based on one or more of availability of the plurality of processors, and a type of each available processor, and based on an amount of memory space in the memory available for the object detection.

4. The apparatus of claim 2, further comprising:
an object detection result generated by the selected object detector;
a baseline object detector coupled to the controller, the baseline object detector configured to generate a baseline object detection result;

a detector selector coupled to a comparator, the comparator configured to measure the object detection result against the baseline object detection result and generate a performance score for the selected object detector; and wherein the detector selector is configured to change the selected object detector to another object detector of the plurality of object detectors based on the performance score.

5. The apparatus of claim 4, wherein the baseline object detector comprises one of the plurality of object detectors.

6. The apparatus of claim 4, wherein the detector selector is further configured to operate the selected object detector more often than the baseline object detector and wherein the baseline object detector uses more computing resources than the selected object detector.

7. The apparatus of claim 1, wherein a complexity level of a plurality of frames changes over time and wherein the controller is further configured to manage object detection based on the complexity level of a plurality of frames within the video stream.

8. The apparatus of claim 7, wherein the controller comprises:
an auto encoder configured to determine a bottleneck for each of two adjacent frames of the video stream; and
a complexity module configured to determine the complexity level for the plurality of frames based on a difference between bottlenecks of adjacent frames of the video stream.

9. The apparatus of claim 1, wherein the one or more factors comprise the operational constraint, the performance metric, a complexity level for one or more frames, object detection results, and an environment condition.

10. The apparatus of claim 1, wherein the controller comprises a mode selector and the controller is further configured to manage object detection by activating the mode selector to change a mode of the object detector.

11. The apparatus of claim 1, wherein the controller comprises a detector switch and the controller is further configured to manage the object detection by activating the detector switch to turn off the object detection.

12. The apparatus of claim 1, wherein the object detector comprises a neural network, the neural network trained prior to use for the object detection.

13. A system, comprising:
a video camera configured to generate a video stream of frames;
one or more processors configured to execute object detection logic, wherein the object detection logic is configured to cause the system to:
perform object detection on the video stream of frames by operating a selected neural network from a plurality of neural networks to generate object detection results;
activate a detector selector to swap the selected neural network with another neural network selected from the plurality of neural networks based on one or more factors;
volatile memory configured to store data for and executable code for the object detection logic;
non-volatile memory configured to store the plurality of neural networks, each neural network comprising different attributes; and
a power source configured to supply electrical power to the non-volatile memory, the volatile memory, the one or more processors, and the video camera.

14. The system of claim 13, wherein the object detection logic is further configured to change the selected neural network in response to the object detection results failing to satisfy one of a plurality of performance metrics or one of a plurality of operational constraints.

15. The system of claim 14, wherein the object detection logic is further configured to change the selected neural network by changing an operating mode for the selected neural network.

16. The system of claim 13, wherein the object detection logic comprises trigger logic configured to direct the object detection logic to replace the selected neural network with another neural network from the plurality of neural networks in response to a change in one of a complexity level for frames of the video stream or a change in one or more operational constraints.

17. The system of claim 13, wherein the object detection logic is further configured to select the selected neural network to perform object detection from the plurality of neural networks based on computing resources available for object detection within the system.

18. An apparatus, comprising:
means for reviewing a video stream generated by a video camera;
means for generating object detection results based on the video stream by way of a selected object detector, the selected object detector selected from a plurality of neural networks, wherein the selected object detector is selected such that attributes of the selected object detector satisfy performance metrics and operational constraints for an object detection operation; and
means for automatically changing the selected object detector to another neural network of the plurality of neural networks based on one or more factors,
wherein at least one of the one or more factors is the object detection results failing to satisfy at least one performance metric for the object detection operation based on one or more object detection results.

19. The apparatus of claim 18, wherein automatically changing the selected object detector comprises changing an operating mode of the selected object detector.

20. The apparatus of claim 12, wherein the neural network comprises a lightweight neural network detector.

* * * * *